US012555633B2

(12) United States Patent
Minemura

(10) Patent No.: US 12,555,633 B2
(45) Date of Patent: Feb. 17, 2026

(54) SEMICONDUCTOR MEMORY DEVICE

(71) Applicant: Kioxia Corporation, Tokyo (JP)

(72) Inventor: Yoichi Minemura, Yokkaichi Mie (JP)

(73) Assignee: Kioxia Corporation, Tokyo (JP)

( * ) Notice: Subject to any disclaimer, the term of this patent is extended or adjusted under 35 U.S.C. 154(b) by 71 days.

(21) Appl. No.: 18/593,980

(22) Filed: Mar. 4, 2024

(65) Prior Publication Data
US 2024/0321359 A1    Sep. 26, 2024

(30) Foreign Application Priority Data

Mar. 16, 2023    (JP) .................... 2023-041973

(51) Int. Cl.
G11C 7/22        (2006.01)
G11C 16/04       (2006.01)
G11C 16/10       (2006.01)
H10B 43/27       (2023.01)

(52) U.S. Cl.
CPC .......... *G11C 16/0483* (2013.01); *G11C 16/10* (2013.01); *H10B 43/27* (2023.02)

(58) Field of Classification Search
CPC ............... G11C 16/0483; G11C 16/10; G11C 11/5628; G11C 5/063; H10B 43/27; H10B 41/35; H10B 41/20; H10B 43/20; H10B 43/35
USPC .................................................. 365/189.011
See application file for complete search history.

(56) References Cited

U.S. PATENT DOCUMENTS

| | | | | |
|---|---|---|---|---|
| 6,859,395 B2* | 2/2005 | Matsunaga | ........ | G11C 16/0483 365/185.11 |
| 7,428,165 B2* | 9/2008 | Oowada | ............ | G11C 16/3427 365/185.26 |
| 7,436,714 B2* | 10/2008 | Yaegashi | ............. | G11C 11/5628 365/185.28 |
| 11,974,432 B2* | 4/2024 | Yamashita | ........... | H10D 64/037 |
| 2022/0302162 A1 | 9/2022 | Yamashita | | |

FOREIGN PATENT DOCUMENTS

JP        2022144075 A    10/2022

* cited by examiner

*Primary Examiner* — Tha-O H Bui
(74) *Attorney, Agent, or Firm* — Kim & Stewart LLP

(57) ABSTRACT

A semiconductor memory device includes a stacked body in which conductive layers are stacked with an insulating layer interposed therebetween, a semiconductor film to provide a channel for a plurality of memory cell transistors having gates electrically connected to the conductive layers of the stacked body, respectively, an insulating film extending in the stacking direction between the conductive layers and the semiconductor film, and a control circuit configured to control a program voltage to be applied to a conductive layer electrically connected to a memory cell transistor that is a target of a write operation, and a transfer voltage to be applied to conductive layers electrically connected to other memory cell transistors that are not the target of the write operation, wherein the control circuit is configured to vary the transfer voltage to be applied depending on a number of bits that are being written in the write operation.

20 Claims, 17 Drawing Sheets

FIG. 5

| WORD LINE | FIRST MODE | SECOND MODE |
|---|---|---|
| DWL4 | SLC | DUMMY |
| DWL3 | SLC | DUMMY |
| WL63 | SLC | SLC |
| WL62 | TLC | TLC |
| ... | | |
| WL2 | TLC | TLC |
| WL1 | TLC | TLC |
| WL0 | SLC | SLC |
| DWL2 | SLC | DUMMY |
| DWL1 | SLC | DUMMY |

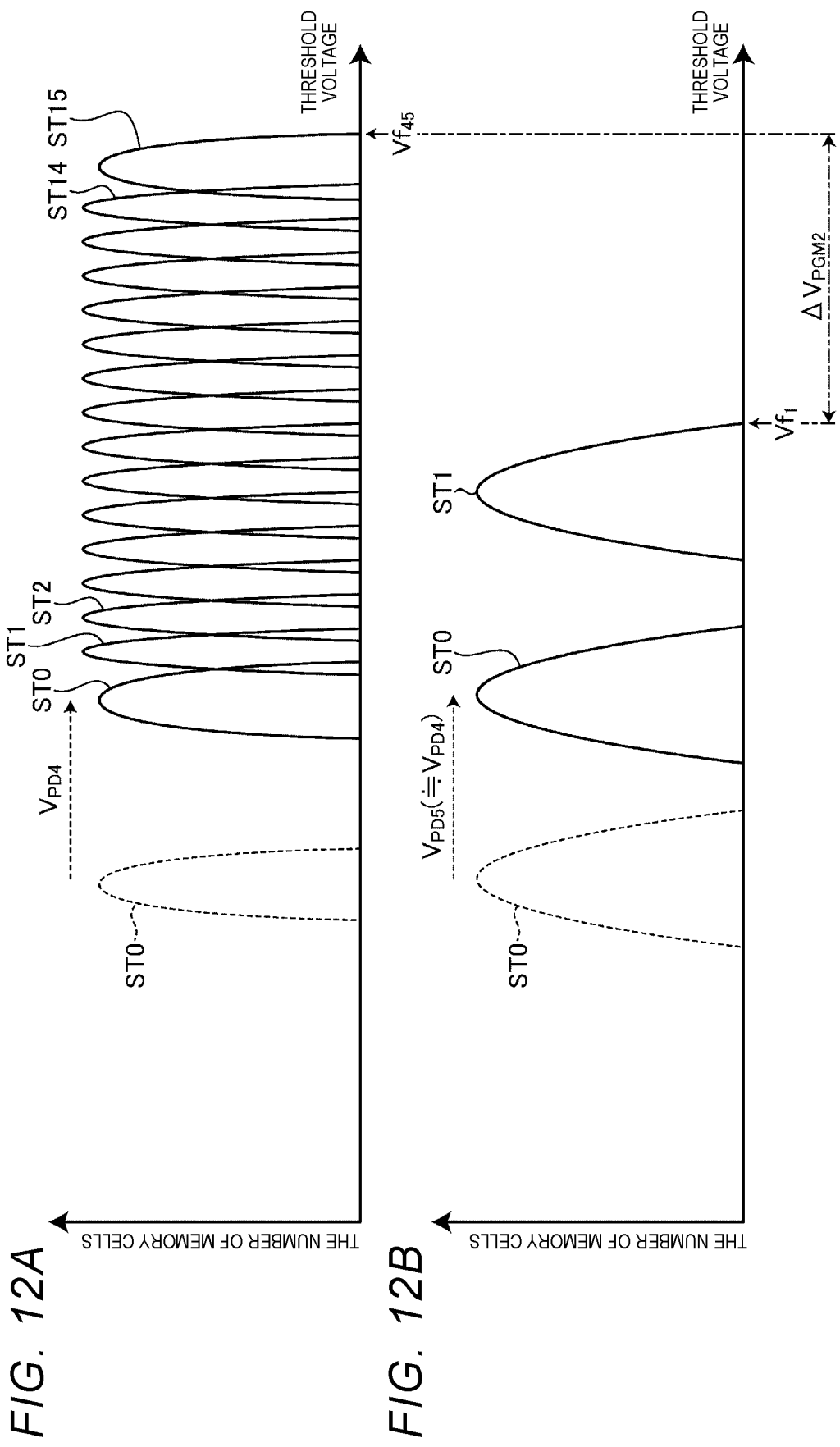

FIG. 15

| WORD LINE | FIRST MODE | SECOND MODE |
|---|---|---|
| DWL8 | SLC | DUMMY |
| DWL7 | SLC | DUMMY |
| WL95 | SLC | SLC |
| WL94 | TLC | TLC |
| ... | | |
| WL49 | TLC | TLC |
| WL48 | SLC | SLC |
| DWL6 | SLC | DUMMY |
| DWL5 | SLC | DUMMY |
| DWL4 | SLC | DUMMY |
| DWL3 | SLC | DUMMY |
| WL47 | SLC | SLC |
| WL46 | TLC | TLC |
| ... | | |
| WL2 | TLC | TLC |
| WL1 | TLC | TLC |
| WL0 | SLC | SLC |
| DWL2 | SLC | DUMMY |
| DWL1 | SLC | DUMMY |

SEMICONDUCTOR MEMORY DEVICE

CROSS-REFERENCE TO RELATED APPLICATION(S)

This application is based upon and claims the benefit of priority from Japanese Patent Application No. 2023-041973, filed Mar. 16, 2023, the entire contents of which are incorporated herein by reference.

FIELD

Embodiments described herein relate generally to a semiconductor memory device.

BACKGROUND

A semiconductor memory device having a three-dimensional structure in which a semiconductor film extends in a stacking direction through a stacked body in which a plurality of conductive layers are stacked with an insulating layer interposed therebetween, and memory cells are formed at intersecting portions of the conductive layers and the semiconductor film, is known. In the semiconductor memory device, it is desired to improve operation reliability.

DESCRIPTION OF THE DRAWINGS

FIG. 5 is a diagram showing an operation mode of the semiconductor memory device according to the embodiment.

FIGS. 12A and 12B are diagrams showing a threshold voltage distribution of a memory cell array in a first modification example of the embodiment.

FIG. 15 is a diagram showing an operation mode of a semiconductor memory device according to the third modification example of the embodiment.

DETAILED DESCRIPTION

Embodiments provide a semiconductor memory device capable of improving operation reliability.

In general, according to one embodiment, a semiconductor memory device including a first stacked body in which a plurality of conductive layers are stacked with an insulating layer interposed therebetween, a semiconductor film to provide a channel for a plurality of memory cell transistors having gates electrically connected to the conductive layers of the first stacked body, respectively, an insulating film extending in the stacking direction between the plurality of conductive layers of the first stacked body and the semiconductor film, and a control circuit configured to control a program voltage to be applied to a conductive layer electrically connected to a memory cell transistor that is a target of a write operation, and a transfer voltage that is less than the program voltage to be applied to conductive layers electrically connected to other memory cell transistors that are not the target of the write operation, wherein the control circuit is configured to vary the transfer voltage to be applied depending on a number of bits that are being written in the write operation.

A semiconductor memory device according to the embodiment will be described in detail with reference to the accompanying drawings. The scope of the present disclosure is not limited by the embodiment and the modifications thereof described herein.

Embodiment

In the semiconductor memory device according to the embodiment, a semiconductor film extends in a stacking direction through a stacked body in which a plurality of conductive layers are stacked with an insulating layer interposed therebetween, and a portion where each conductive layer and the semiconductor film intersect functions as a memory cell, and efforts are made to improve operation reliability of the memory cell.

Figure 1:
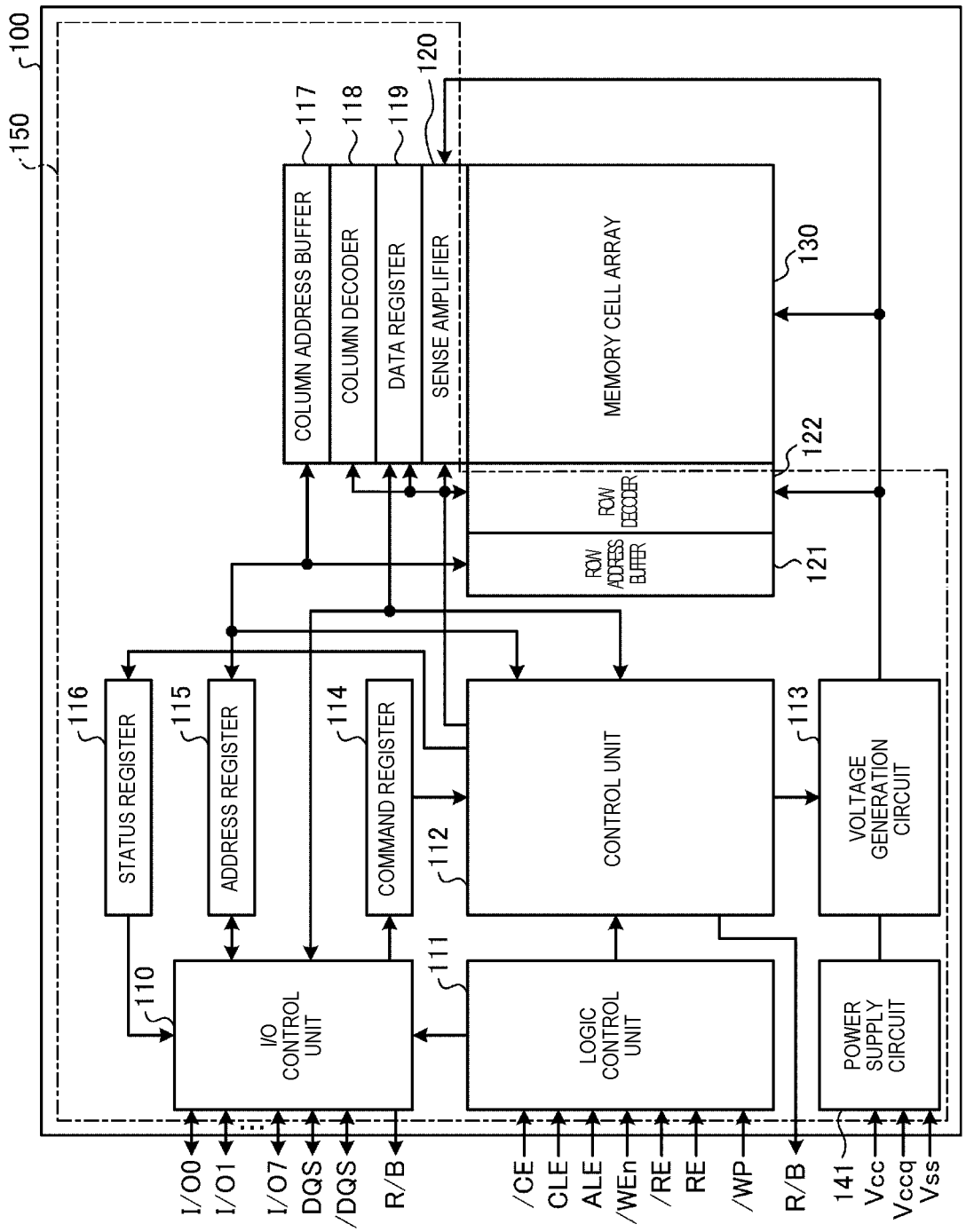
FIG. 1 is a block diagram showing a configuration of a semiconductor memory device according to an embodiment.

A semiconductor memory device 100 may be configured as shown in FIG. 1. FIG. 1 is a block diagram showing a configuration of the semiconductor memory device 100.

The semiconductor memory device 100 is, for example, a nonvolatile memory such as a NAND flash memory, and may be configured as shown in FIG. 1. The semiconductor memory device 100 has a memory cell array 130 and a peripheral circuit 150.

The peripheral circuit 150 includes the following circuits: an I/O control unit 110, a logic control unit 111, a control unit 112, a voltage generation circuit 113, a command register 114, an address register 115, a status register 116, a column address buffer 117, a column decoder 118, a data register 119, a sense amplifier 120, a row address buffer 121, a row decoder 122, a power supply circuit 141, and a clock generation circuit 142.

The logic control unit 111 receives input of various control signals via input pins (CE, ALE, and the like) for the various control signals. The I/O control unit 110 executes distribution of data received through an I/O signal to a register that is a storage destination of the I/O signal, based on the control signal received by the logic control unit 111. The logic control unit 111 transfers the received control signal to the control unit 112. The CE shown as the input pin of the logic control unit 111 indicates a chip enable pin of the semiconductor memory device 100.

The control unit 112 includes a state transition circuit (state machine) that performs state transition based on various control signals received via the logic control unit 111, and controls the overall operation of the semiconductor memory device 100.

The I/O control unit 110 is a buffer circuit for performing communication of an I/O signal and a strobe signal between the I/O control unit 110 and a controller 20 via I/O signal pins I/O0 to I/O7 and strobe pins DQS and/DQS. The command, address, and data (e.g., write data) are received as the I/O signals by the I/O control unit 110 via the I/O signal pins I/O0 to I/O7 and are distributed and stored in the address register 115, the command register 114, and the data register 119, respectively.

The power supply circuit 141 receives, for example, power supply voltages Vcc, Vccq, and Vss from the controller 20 via a power supply pin, and supplies these voltages to each part of the semiconductor memory device 100. The power supply voltage Vccq is, for example, a power supply voltage used for the operation of the I/O control unit 110. The power supply voltage Vss is, for example, a ground voltage.

The control unit 112 provides an instruction about a voltage value to be generated and a power supply timing to the voltage generation circuit 113. The control unit 112 includes the clock generation circuit 142. The clock generation circuit 142 supplies a clock signal CLK to, for example, a charge pump circuit 1. In addition, the control unit 112 transmits a ready/busy signal R/B to the controller 20.

The voltage generation circuit 113 generates a predetermined voltage under the control of the control unit 112. The voltage generation circuit 113 supplies the generated voltage to the memory cell array 130, the row decoder 122, and the sense amplifier 120.

The status register 116 stores status information indicating whether or not writing to the memory cell array 130 is successful, status information indicating whether or not erasing to the memory cell array 130 is successful, and the like. The status information is transmitted by the I/O control unit 110 to the controller 20 as a response signal.

The memory cell array 130 includes a plurality of memory cells, and stores write data from a host (not shown).

The row decoder 122, the column decoder 118, and the sense amplifier 120 access the memory cell array 130 based on the control by the control unit 112.

The row decoder 122 selects a word line corresponding to a row address and activates the selected word line.

The column decoder 118 selects and activates a bit line corresponding to a column address. The bit line may be electrically connected to a memory string MS to be described below.

The sense amplifier 120 applies a voltage to the bit line selected by the column decoder 118, and writes the data stored in the data register 119 into a memory cell transistor located at an intersection between the word line selected by the row decoder 122 and the bit line (memory string MS) selected by the column decoder 118. In addition, the sense amplifier 120 reads the data stored in the memory cell transistor located at the intersection between the word line selected by the row decoder 122 and the bit line (memory string MS) selected by the column decoder 118 via the bit line, and stores the read data in the data register 119.

The data stored in the data register 119 is sent to the I/O control unit 110 through a data line, and transferred from the I/O control unit 110 to the outside (for example, a controller).

Figure 2:
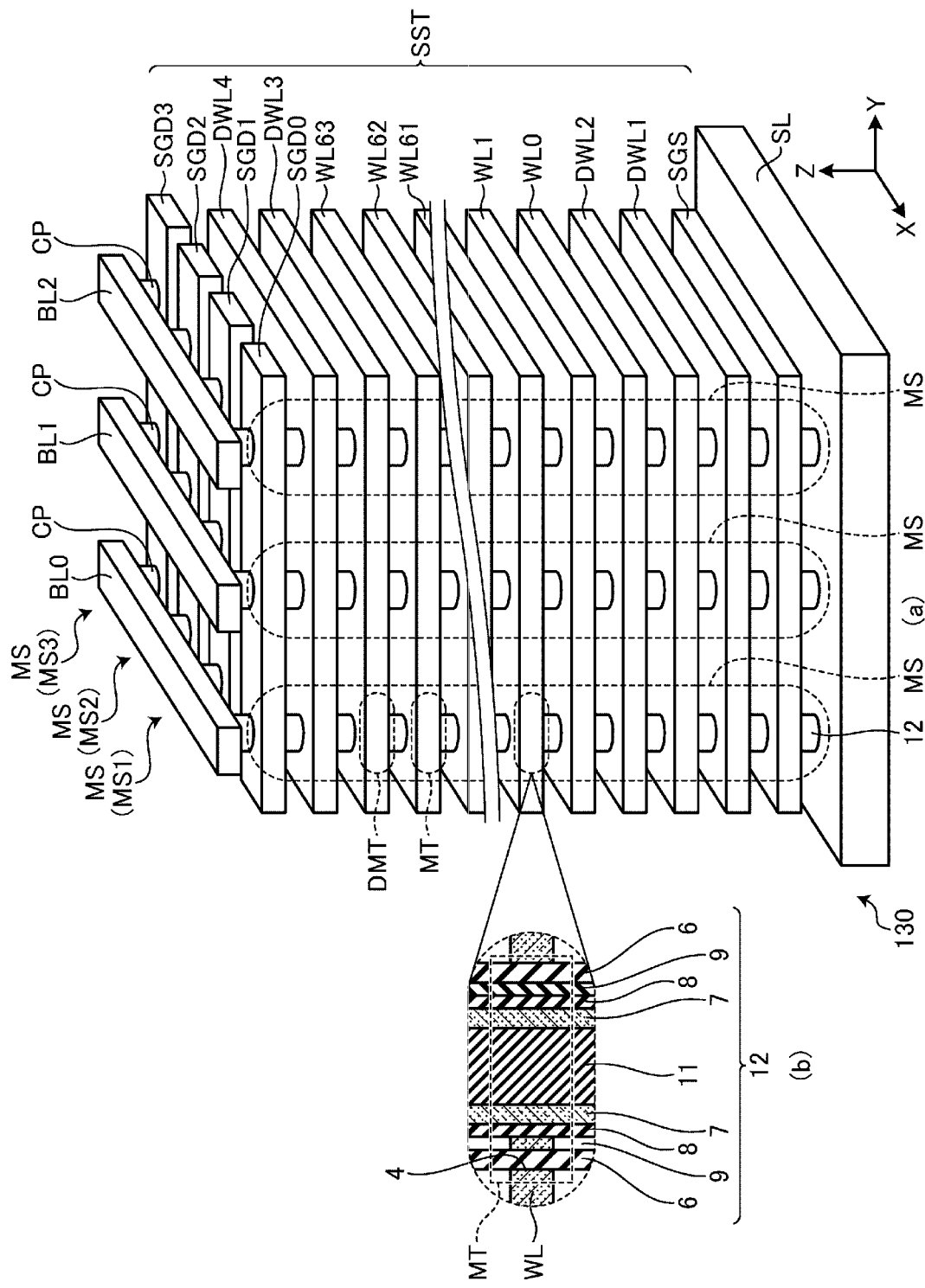
FIG. 2 is a perspective view showing a configuration of a memory cell array in the embodiment.

The memory cell array 130 may be configured as shown in FIG. 2. FIG. 2 is a perspective view showing a configuration of the memory cell array 130. In FIG. 2, for the sake of simplicity, an insulating layer and an interlayer insulating film are not shown.

A source line SL extends in a plate shape above a substrate (not shown). Hereinafter, a direction perpendicular to a surface of the source line SL is referred to as a Z direction, and two directions orthogonal to each other in a plane perpendicular to the Z direction are referred to as an X direction and a Y direction. A stacked body SST is stacked on the +Z side of the source line SL.

In the stacked body SST, a plurality of conductive layers are stacked with an insulating layer interposed therebetween. For example, a source side select gate line SGS is formed of a conductive layer on the +Z side of the source line SL. On the +Z side of the source side select gate line SGS, a plurality of layers of dummy word lines DWL, a plurality of layers of word lines WL, and a plurality of layers of dummy word lines DWL are each formed of conductive layers and are stacked in the Z direction. FIG. 2 shows an example in which two layers of dummy word lines DWL1 and DWL2, 64 layers of word lines WL0 to WL63, and two layers of dummy word lines DWL3 and DWL4 are each formed of conductive layers and are stacked. Drain side select gate lines SGD0 to SGD3 are formed of conductive layers on the +Z side of the dummy word line DWL on the most +Z side.

The source side select gate line SGS extends in the XY direction on the +Z side of the source line SL. The dummy word lines DWL1 and DWL2 extend in the XY direction on the +Z side of the source side select gate line SGS. The word lines WL0 to WL64 extend in the XY direction on the +Z side of the dummy word lines DWL1 and DWL2. The dummy word lines DWL3 and DWL4 extend in the XY direction on the +Z side of the word lines WL0 to WL64. The drain side select gate lines SGD0 to SGD3 extend in the Y direction on the +Z side of the dummy word lines DWL3 and DWL4.

A columnar body 12 extends in the Z direction through the stacked body SST. The columnar body 12 extends in the Z direction to penetrate the source side select gate line SGS, the dummy word lines DWL1 and DWL2, the word lines WL0 to WL63, the dummy word lines DWL3 and DWL4, and the drain side select gate lines SGD0 to SGD3. Each of the drain side select gate lines SGD0 to SGD3 corresponds to a different string unit SU. That is, the string unit SU includes a plurality of memory strings MS arranged along the Y direction, and is a unit selectively accessible by the drain side select gate lines SGD0 to SGD3.

Bit lines BL0 to BL2 extend in the X direction on the +Z side of the drain side select gate lines SGD0 to SGD3. The extension direction (X direction) of the bit lines BL0 to BL2 is orthogonal to the extension direction (Y direction) of the drain side select gate lines SGD0 to SGD3 and is orthogonal to the stacking direction (Z direction) of the word lines WL0 to WL63. The columnar body 12 extends, for example, from the source line SL to the bit lines BL0 to BL2 in the Z direction.

A columnar insulator 11 is formed at the center of the columnar body 12. As a material of the columnar insulator 11, for example, a silicon oxide film may be used. A channel semiconductor film 7 is formed between an outer surface of the columnar insulator 11 and an inner surface of a through-hole 4, a tunnel insulating film 8 is formed between the inner surface of the through-hole 4 and the channel semiconductor film 7, a charge storage film 9 is formed between the inner surface of the through-hole 4 and the tunnel insulating film 8, and a block insulating film 6 is formed between the inner surface of the through-hole 4 and the charge storage film 9.

For example, the channel semiconductor film 7, the tunnel insulating film 8, the charge storage film 9, and the block insulating film 6 are each configured to penetrate the source side select gate line SGS, the dummy word lines DWL1 and DWL2, the word lines WL0 to WL63, the dummy word lines DWL3 and DWL4, and the drain side select gate lines SGD0 to SGD3.

As the channel semiconductor film 7, for example, a semiconductor such as Si may be used. As the tunnel insulating film 8 and the block insulating film 6, for example, a silicon oxide film may be used. As the charge storage film 9, for example, a silicon nitride film or an ONO film (a three-layer structure of a silicon oxide film/a silicon nitride film/a silicon oxide film) may be used.

In FIG. 2, a configuration in which 64 layers of the memory cells MT are stacked is described, but the number of the stacked layers of the memory cells MT is not limited to 64 layers, and may be 63 layers or less, or 65 layers or more.

In addition, in the example of FIG. 2, the method of forming the columnar insulator 11 at the center of the columnar body 12 penetrating the source side select gate line SGS, the word lines WL0 to WL3, and the drain side select gate lines SGD0 to SGD3 is described, and a columnar semiconductor may be embedded instead of the columnar insulator 11.

Figure 3:
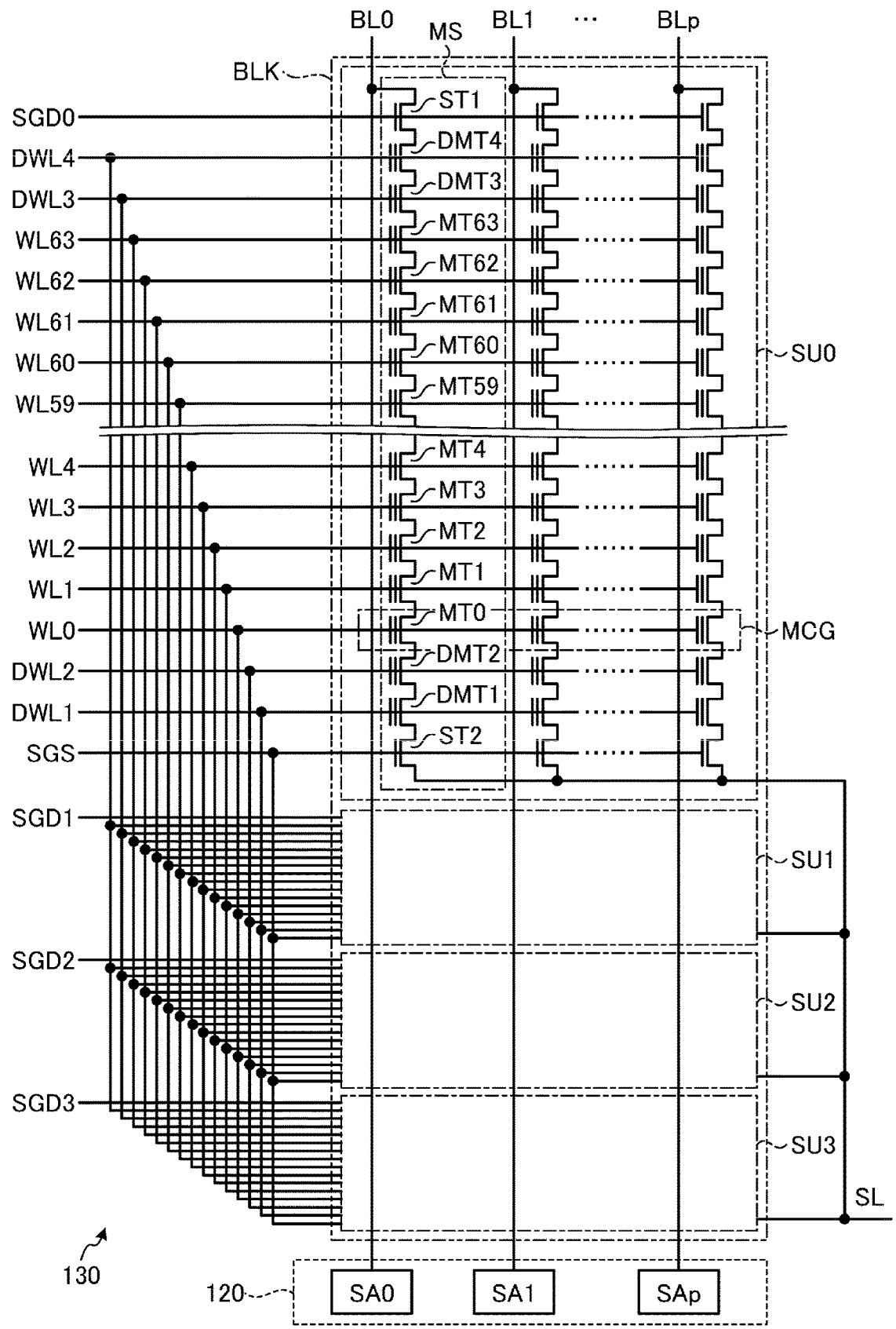
FIG. 3 is a circuit diagram showing a configuration of a block in the embodiment.

The memory cell array 130 has a plurality of blocks. Each block has a plurality of memory cell transistors MT at intersection positions of a plurality of word lines and column bodies 12 connected to a plurality of bit lines. Hereinafter, the memory cell transistor MT will be simply referred to as a memory cell MT. FIG. 3 is a circuit diagram showing a configuration example of one block.

A block BLK has a plurality of string units SU0 to SU3. The plurality of string units SU0 to SU3 correspond to the drain side select gate lines SGD0 to SGD3 and share the source side select gate line SGS. The string units SU0 to SU3 are selectively accessible by the drain side select gate lines SGD0 to SGD3. Each of the string units SU0 to SU3 includes a plurality of memory strings MS.

Each memory string MS includes, for example, 64 memory cells MT (MT0 to MT63) and select transistors ST1 and ST2. The memory cell MT has a control gate and a charge storage film, and stores data in a non-volatile manner. Then, the 64 memory cells MT (MT0 to MT63) are connected in series between a source of the select transistor ST1 and a drain of the select transistor ST2. The number of the memory cells MT in the memory string MS is not limited to 64.

The bit lines BL0 to BLp (indicated by BL when the bit lines are not distinguished) are connected to the memory string MS. When the select transistor ST1 is turned on, a channel region of each of the memory cells MT in the memory string MS may be electrically connected to the bit line BL. A corresponding sense amplifier SA among a plurality of sense amplifiers SA0 to SAp in a sense amplifier circuit SAC is connected to each bit line BL.

The word lines WL0 to WL63 (indicated by WL when the word lines are not distinguished) commonly connect control gates of the memory cells MT across the memory strings MS in each string unit SU in a physical block BLK. That is, in each string unit SU in the physical block BLK, the control gates of the memory cells MT located in each row are connected to the same word line WL. That is, the string unit SU of the physical block BLK includes a plurality of memory cell groups MCG corresponding to the plurality of word lines WL, and each of the memory cell groups MCG includes (p+1) memory cells MT connected to the same word line WL. When each memory cell MT is configured to store 1-bit value (when operating in a single-level cell (SLC) mode), the (p+1) memory cells MT (that is, the memory cell group MCG) connected to the same word line WL are treated as one physical page, and a data write operation and a data read operation are performed for each physical page.

In addition, the dummy word line DWL1 and the dummy word line DWL2 are provided between the source side select gate line SGS and the word line WL0. Between the select transistor ST2 and the memory cell MT0 in each memory string MST, a dummy memory cell DMT1 and a dummy memory cell DMT2 are provided corresponding to the dummy word line DWL1 and the dummy word line DWL2. The dummy memory cell DMT1 and the dummy memory cell DMT2 each have the same structure as the memory cell MT.

The dummy word line DWL3 and the dummy word line DWL4 are provided between the word line WL63 and the drain side select gate line SGD. Between the memory cell MT63 and the select transistor ST1 in each memory string MST, a dummy memory cell DMT3 and a dummy memory cell DMT4 are provided corresponding to the dummy word line DWL3 and the dummy word line DWL4. The dummy memory cell DMT3 and the dummy memory cell DMT4 each have the same structure as the memory cell MT.

Each memory cell MT may be programmed to store a multiple-bit value. For example, when each memory cell MT can be programmed to store an n-bit value (n≥2), a storage capacity per word line WL is equal to the size of n physical pages. That is, each memory cell group MCG is treated as n physical pages. For example, in a multi-level cell (MLC) mode in which each memory cell MT stores a 2-bit value, each word line WL stores data for two physical pages. Alternatively, in a triple-level cell (TLC) mode in which each memory cell MT stores a 3-bit value, each word line WL stores data for three physical pages. Alternatively, in a quad-level cell (QLC) mode in which each memory cell MT stores a 4-bit value, each word line WL stores data for four physical pages. Alternatively, in a penta-level cell (PLC) mode in which each memory cell MT stores a 5-bit value, each word line WL stores data for five physical pages.

As shown in FIGS. 4A to 4E, as the generation progresses, a margin of a nonvolatile memory 20 is becoming tighter with respect to the reliability of the memory cell at the time of reading in the memory cell array 23. FIGS. 4A to 4E are diagrams showing a threshold voltage distribution of the memory cell array 23.

Figure 4A:
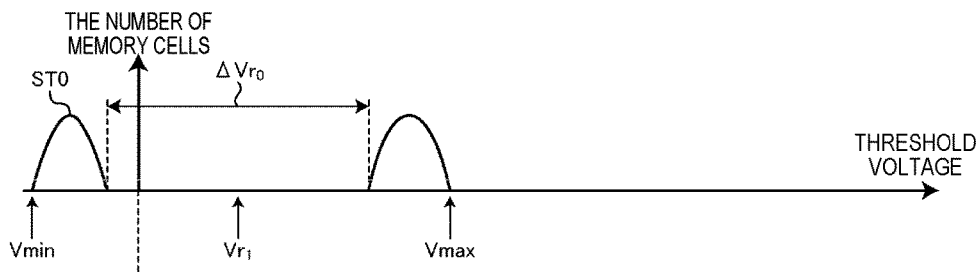
FIGS. 4A to 4E are diagrams showing a threshold voltage distribution of the memory cell array in the embodiment.

For example, when data is written into the memory cell in the SLC mode, as shown in FIG. 4A, two states ST0 and ST1 exist within a range in which a threshold voltage is controlled (range of Vmin to Vmax). Each state ST indicates a distribution of the threshold voltage of the memory cell. Each state ST is correlated with a different 1-bit value. The states ST0 and ST1 may be correlated with "1" and "0", respectively. A voltage margin $\Delta Vr0$ between the states ST0 and ST1 is relatively wide, and a wide voltage margin can be secured between a read voltage Vr1 and the states ST on both sides. Therefore, it is considered that a bit error rate (BER) when the data of the memory cell is read with the read voltage Vr1 is relatively low.

Figure 4B:
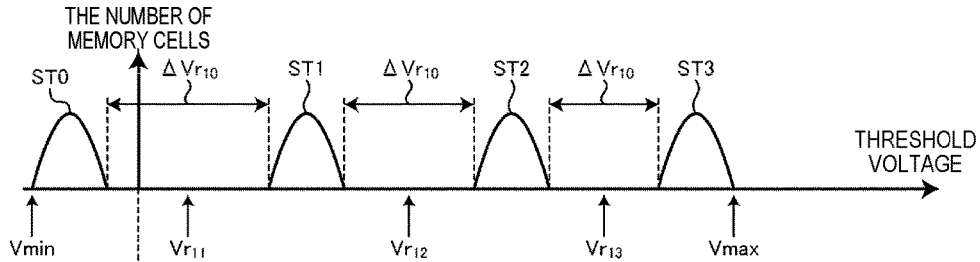

When data is written into the memory cell in the MLC mode, as shown in FIG. 4B, four states ST0 to ST3 exist within a range in which the threshold voltage is controlled (range of Vmin to Vmax). Each state ST indicates a distribution of the threshold voltage of the memory cell. Each state ST is correlated with a different 2-bit value. The states ST0, . . . , ST3 may be correlated with "11", . . . , "00", respectively. A voltage margin ΔVr10 between the states ST0 to ST3 is narrower than the voltage margin ΔVr0 of the SLC, and a voltage margin between each of read voltages Vr11 to Vr13 and the states ST on both sides is narrower than that of the SLC. Therefore, it is considered that a bit error rate (BER) when the data of the memory cell is read with each of the read voltages Vr11 to Vr13 is higher than that of the SLC.

Figure 4C:
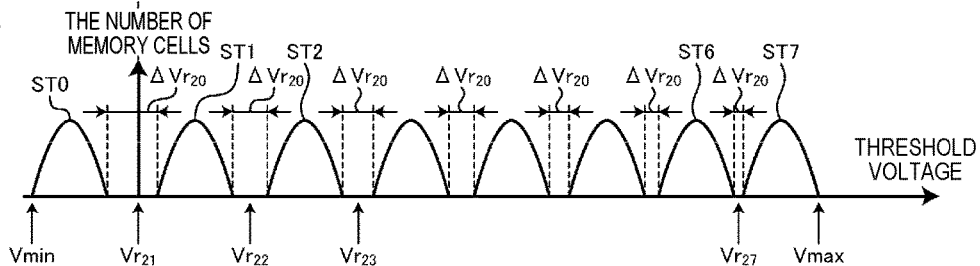

When data is written into the memory cell in the TLC mode, as shown in FIG. 4C, eight states ST0 to ST7 exist within a range in which the threshold voltage is controlled (range of Vmin to Vmax). Each state ST indicates a distribution of the threshold voltage of the memory cell. Each state ST is correlated with a different 3-bit value. The states ST0, . . . , ST7 may be correlated with "111", . . . , "000", respectively. A voltage margin ΔVr20 between the states ST0 to ST7 is narrower than the voltage margin ΔVr10 of the MLC, and a voltage margin between each of read voltages Vr21 to Vr27 and the states ST on both sides is narrower than that of the MLC. Therefore, it is considered that a bit error rate (BER) when the data of the memory cell is read with each of the read voltages Vr21 to Vr27 is higher than that of the MLC.

Figure 4D:
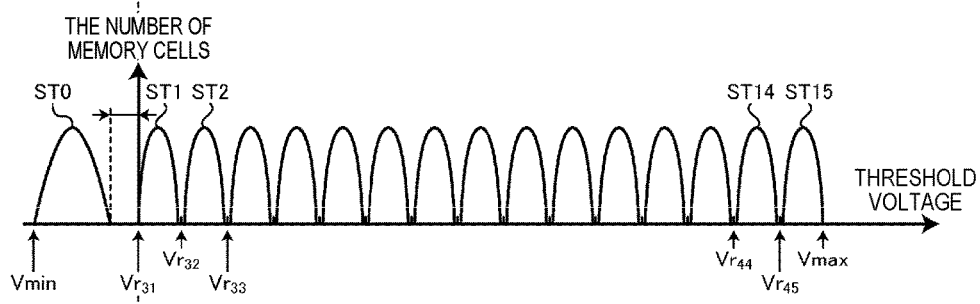
Figure 16:
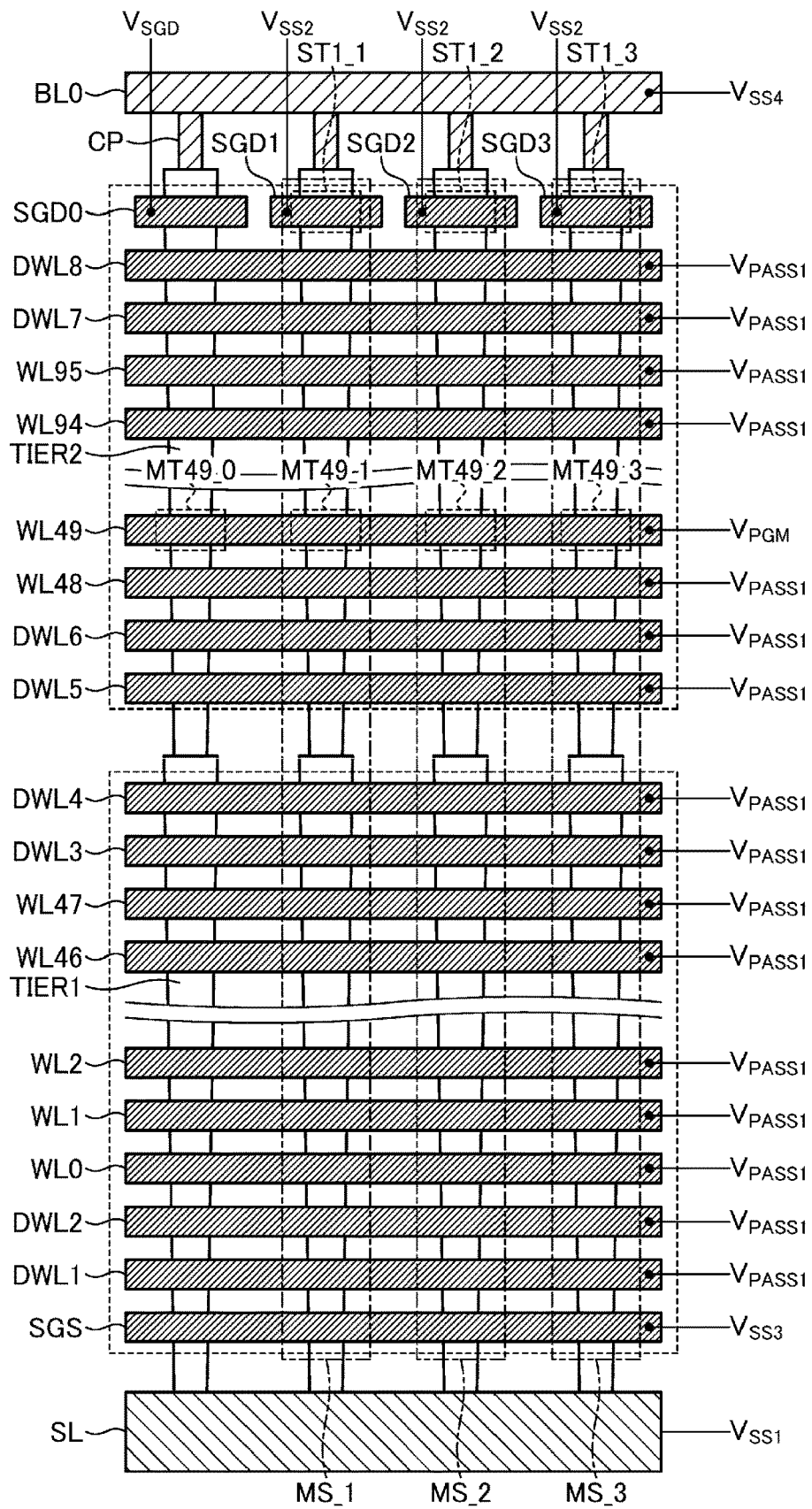
FIG. 16 is a sectional view showing an operation of the semiconductor memory device according to the third modification example of the embodiment.

When data is written into the memory cell in the QLC mode, as shown in FIG. 4D, 16 states ST0 to ST15 exist within a range in which the threshold voltage is controlled (range of Vmin to Vmax). Each state ST indicates a distribution of the threshold voltage of the memory cell. Each state ST is correlated with a different 4-bit value. The states ST0, . . . , ST15 may be correlated with "1111", . . . , "0000", respectively. A voltage margin between the states ST0 to ST15 is narrower than the voltage margin ΔVr20 of the TLC, and a voltage margin between each of read voltages Vr31 to Vr45 and the states ST on both sides is narrower than that of the TLC. Therefore, it is considered that a bit error rate (BER) when the data of the memory cell is read with each of the read voltages Vr31 to Vr45 is higher than that of the TLC.

Figure 4E:
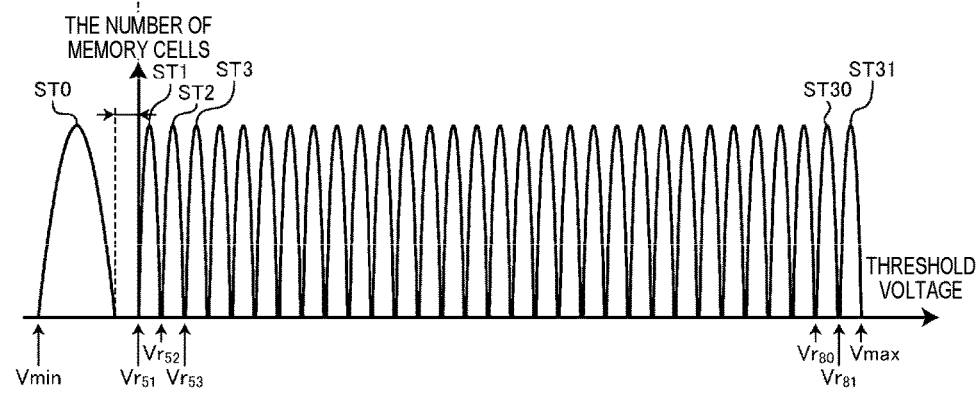

When data is written into the memory cell in the PLC mode, as shown in FIG. 4E, 32 states ST0 to ST31 exist within a range in which the threshold voltage is controlled (range of Vmin to Vmax). Each state ST indicates a distribution of the threshold voltage of the memory cell. Each state ST is correlated with a different 5-bit value. The states ST0, . . . , ST31 may be correlated with "11111", . . . , "00000", respectively. A voltage margin between the states ST0 to ST31 is narrower than the voltage margin of the QLC, and a voltage margin between each of read voltages Vr51 to Vr81 and the states ST on both sides is narrower than that of the QLC. Therefore, it is considered that a bit error rate (BER) when the data of the memory cell is read with each of the read voltages Vr51 to Vr81 is higher than that of the QLC.

In the memory cell array 130, the word lines WL0 and WL63 at both ends in the Z direction are different from the word lines WL1 to WL62 on the inner side, and the adjacent word lines WL exist only on one side in the Z direction (see FIG. 2). Therefore, the word lines WL0 and WL63 at both ends in the Z direction are more susceptible to the electric field when a program voltage is applied to the word lines WL other than the word lines WL1 to WL62 on the inner side.

3:29 In consideration of this point, the semiconductor memory device 100 has an operation mode as shown in FIG. 5. FIG. 5 is a diagram showing an operation mode of the semiconductor memory device 100.

In a first mode, data is written into the memory cells corresponding to the word lines WL1 to WL62 on the inner side in the TLC mode, and data is written into the memory cells corresponding to the word lines WL0 and WL63 at both ends in the Z direction in the SLC mode. At this time, data is also written into the memory cells corresponding to the dummy word lines DWL1 and DWL2 on the −Z side of the word lines WL0 to WL63 in the SLC mode, and the data capacity corresponding to the TLC mode can be achieved in the memory cells corresponding to the dummy word lines DWL1 and DWL2 and the word line WL0. Data is also written into the memory cells corresponding to the dummy word lines DWL3 and DWL4 on the +Z side of the word lines WL0 to WL63 in the SLC mode, and the data capacity corresponding to the TLC mode can be achieved in the memory cells corresponding to the word line WL63 and the dummy word lines DWL3 and DWL4.

In a second mode, data is written into the memory cells corresponding to the word lines WL1 to WL62 on the inner side in the TLC mode, and data is written into the memory cells corresponding to the word lines WL0 and WL63 at both ends in the Z direction in the SLC mode. At this time, data is not written into the memory cells corresponding to the dummy word lines DWL1 and DWL2 on the −Z side of the word lines WL0 to WL63. Data is not written into the memory cells corresponding to the dummy word lines DWL3 and DWL4 on the +Z side of the word lines WL0 to WL63.

In both the first mode and the second mode, data is written into the memory cells MT corresponding to the word lines WL0 and WL63 at both ends in the Z direction among the plurality of word lines WL0 to WL63 in the SLC mode, and data is written into the memory cells MT corresponding to the word lines WL1 to WL62 on the inner side in the TLC mode.

Figure 6:
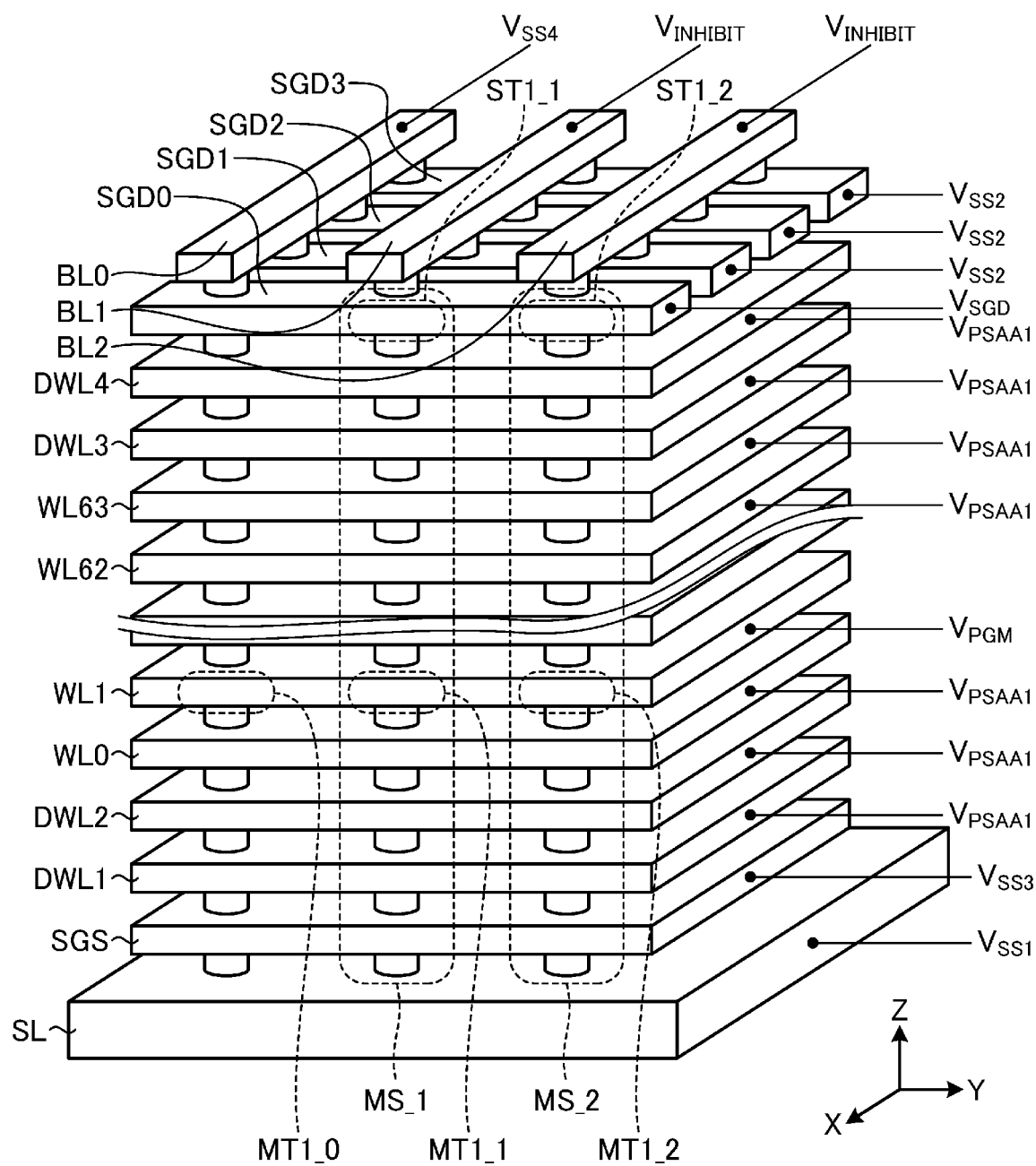
FIG. 6 is a perspective view showing an operation of the semiconductor memory device in the embodiment.
Figure 7:
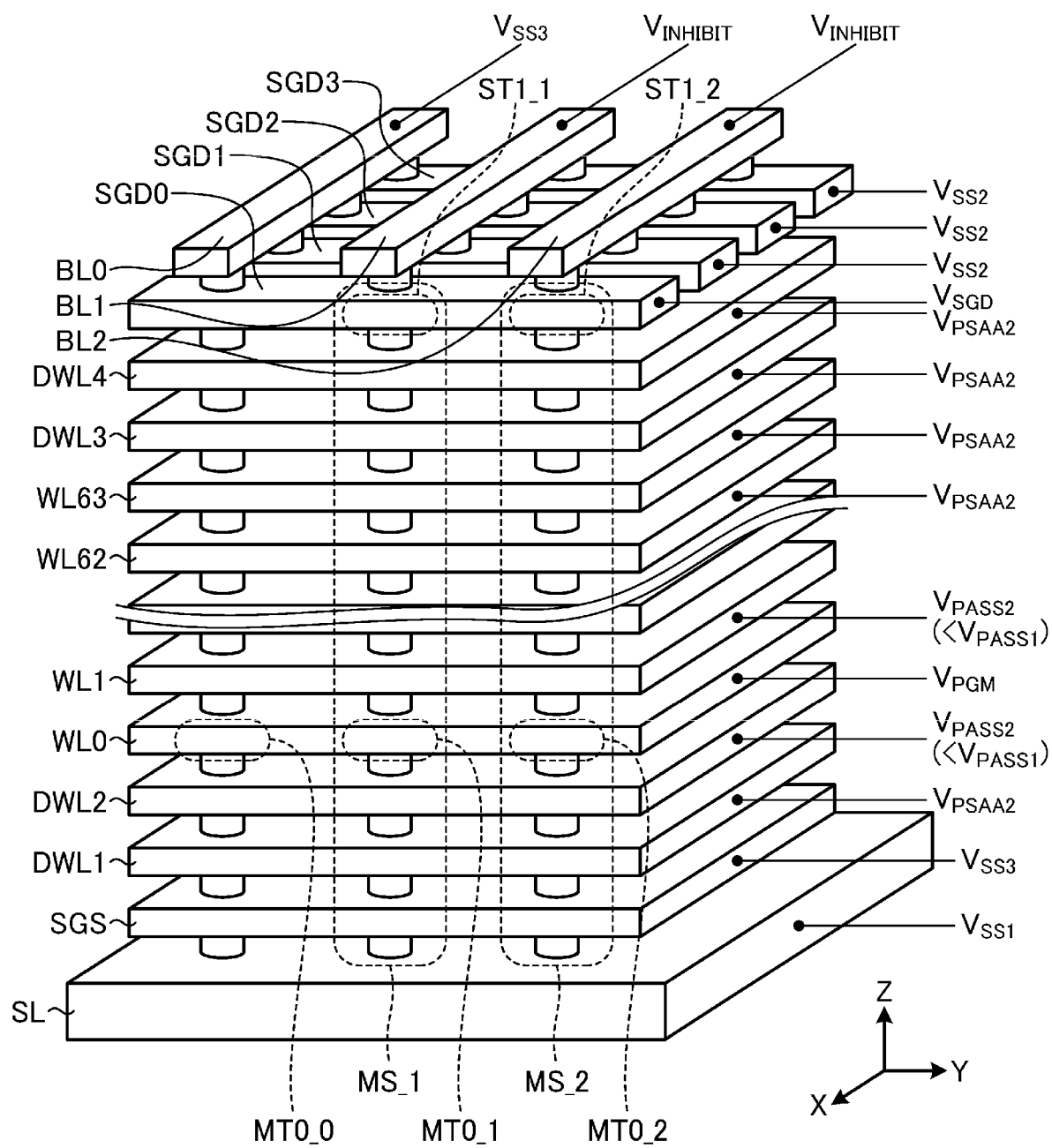
FIG. 7 is a perspective view showing an operation of the semiconductor memory device in the embodiment.

Accordingly, the semiconductor memory device 100 performs a write operation as shown in FIGS. 6 and 7. FIG. 6 and FIG. 7 are perspective views showing the operation of the semiconductor memory device 100.

In the following description, a word line connected to a page to be a target of a program operation is referred to as a selected word line WL, and the rest of the word lines are referred to as non-selected word lines WL. The memory cell MT for which the threshold voltage is to be increased in the page to be the target of the program operation is referred to as a selected memory cell MT, and a memory string including the selected memory cell MT is referred to as a selected memory string MS. Similarly, the memory cell MT for which the threshold voltage is to be maintained in the page to be the target of the program operation is referred to as a non-selected memory cell MT, and the memory string MS including the non-selected memory cell MT is referred to as a non-selected memory string MS. The memory cell MT belonging to a page that is not the target of the program operation is also referred to as the non-selected memory cell MT. The bit line BL connected to the selected memory string MS is referred to as a selected bit line BL, and the bit line connected to the non-selected memory string MS is referred to as a non-selected bit line BL.

FIG. 6 shows a write operation in the TLC mode to the memory cells corresponding to the word lines WL1 to WL62 on the inner side. For example, when data is written into the selected memory cell MT1_0 corresponding to the selected word line WL1 in the TLC mode, a program voltage $V_{PGM}$ is applied to the selected word line WL1, and a transfer voltage $V_{PASS1}$ is applied to the non-selected word lines WL0 and WL2 to WL63 and the dummy word lines DWL1 to DWL4. The program voltage $V_{PGM}$ is substantially equal to, for example, a verify voltage Vf27 (refer to FIGS. 8A and 8B) of the state ST7 on the highest voltage side in the TLC mode. The verify voltage Vf27 of the state ST7 in the TLC mode is, for example, 24 V. The transfer voltage $V_{PASS1}$ is, for example, 10 V. A reference voltage $V_{SS4}$ is applied to the selected bit line BL0, and a write inhibit voltage $V_{INHIBIT}$ is applied to the non-selected bit lines BL1 and BL2. The reference voltage $V_{SS4}$ is, for example, 0 V. The write inhibit voltage $V_{INHIBIT}$ is, for example, 5 V.

A reference voltage $V_{SS3}$ is applied to the selected source side select gate line SGS, a select voltage $V_{SGD}$ is applied to the selected drain side select gate line SGD0, and a reference voltage $V_{SS2}$ is applied to the non-selected drain side select gate lines SGD1 to SGD3. The reference voltage $V_{SS3}$ is, for example, 0 V. The select voltage $V_{SGD}$ is, for example, 2.5 V. The reference voltage $V_{SS2}$ is, for example, 0 V.

At this time, the select transistors ST1_1 and ST1_2 corresponding to the non-selected bit lines BL1 and BL2 or the non-selected drain side select gate lines SGD1 to SGD3 are turned off, and the non-selected memory strings MS_1 and MS_2 enter a floating state. The non-selected memory strings MS_1 and MS_2 may be boosted to a predetermined voltage $V_{BOOST1}$ by being coupled to the non-selected word lines WL0 and WL2 to WL63. The predetermined voltage $V_{BOOST1}$ is a voltage corresponding to the transfer voltage $V_{PASS1}$ of the non-selected word lines WL0 and WL2 to WL63, and may be substantially equal to the transfer voltage $V_{PASS1}$. Accordingly, the memory cells MT1_1 and MT1_2 corresponding to an intersection position between the selected word line WL1 and the non-selected memory strings MS_1 and MS_2 receive program disturbance according to a voltage difference $\Delta V_{DISTURB1}$ between the program voltage $V_{PGM}$ and the predetermined voltage $V_{BOOST1}$. The following Expression 1 is established for the voltage difference $\Delta V_{DISTURB1}$.

$$\Delta V_{DISTURB1} = V_{PGM} - V_{BOOST1} \approx V_{PGM1} - V_{PASS1} \quad \text{Expression 1}$$

For example, when $V_{PGM}=24$ V and $V_{PASS1}=10$ V, the voltage difference $\Delta V_{DISTURB1} \approx 14$ V according to Expression 1.

Figure 8:
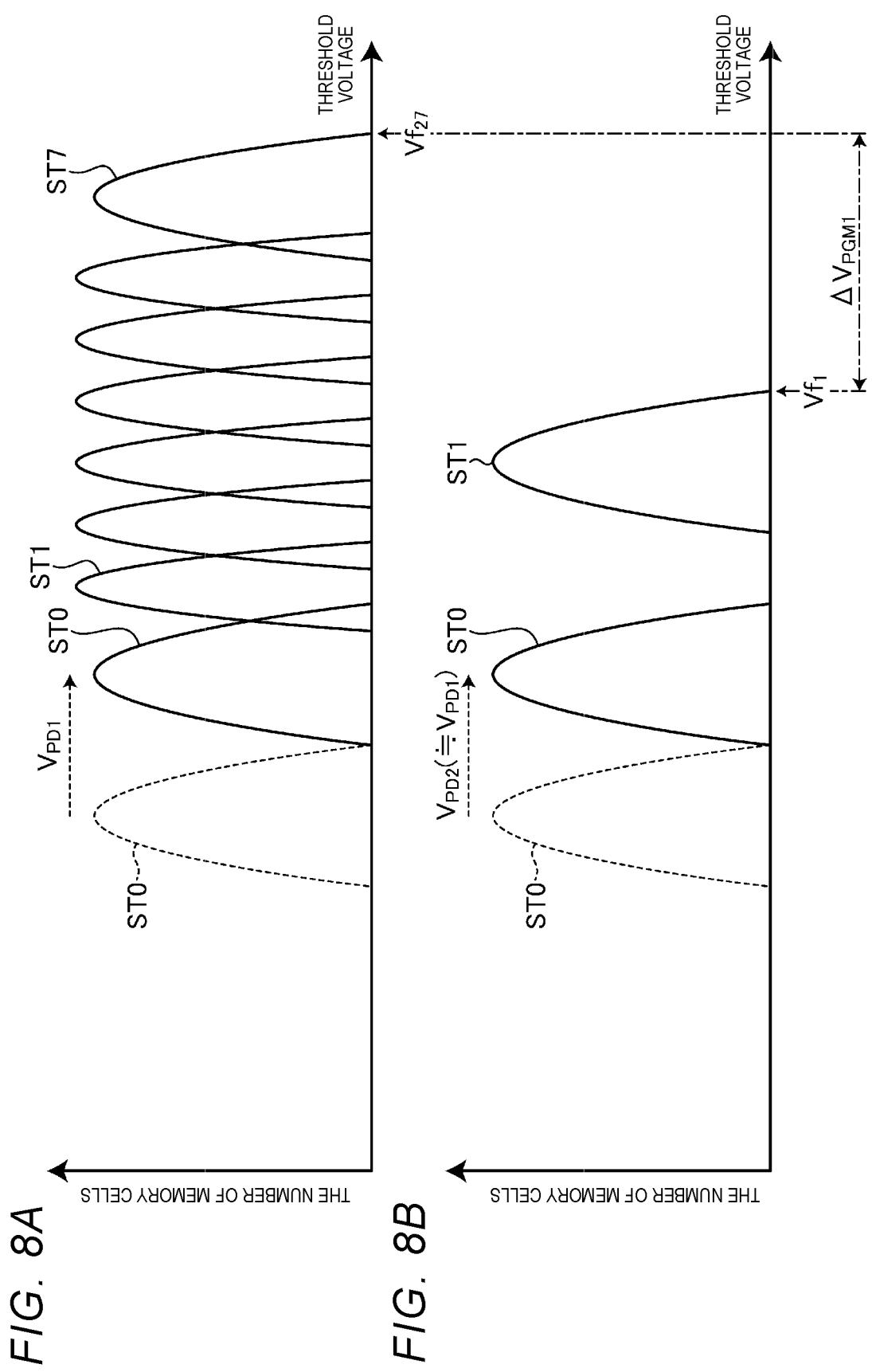
FIGS. 8A and 8B are diagrams showing a threshold voltage distribution of the memory cell array in the embodiment.

Due to the program disturbance according to the voltage difference $\Delta V_{DISTURB1}$, the state ST0 in an erase state may be shifted from a state indicated by a dotted line to a state indicated by a solid line in FIG. 8A in the threshold voltage distribution of the memory cell into which data is written in the TLC mode. For example, the state ST0 in the erase state may be shifted to the high voltage side by a shift amount $V_{PD1}$ corresponding to the voltage difference $\Delta V_{DISTURB1}$, (for example, 14 V).

FIG. 7 shows a write operation to the memory cells corresponding to the word lines WL0 and WL63 at both ends in the Z direction. For example, when data is written into the selected memory cell MT0_0 corresponding to the selected word line WL0 in the SLC mode, a program voltage $V_{PGM}$ is applied to the selected word line WL0, and a transfer voltage $V_{PASS2}$ is applied to the non-selected word lines WL1 to WL63 and the dummy word lines DWL1 to DWL4. The program voltage $V_{PGM}$ is substantially equal to, for example, a verify voltage Vf1 (refer to FIGS. 8A and 8B) of the state ST1 on the highest voltage side in the SLC mode. The verify voltage Vf1 of the state ST1 in the SLC mode is, for example, 20 V. The transfer voltage $V_{PASS2}$ is lower than the transfer voltage $V_{PASS1}$. As shown in Expression 2 and Expression 3, the transfer voltage $V_{PASS2}$ may be lower than the transfer voltage $V_{PASS1}$ according to a difference $\Delta V_{PGM1}$ between the verify voltage Vf27 and the verify voltage Vf1.

$$\Delta V_{PGM1} = Vf27 - Vf1 \quad \text{Expression 2}$$

$$V_{PASS2} = V_{PASS1} - \Delta V_{PGM1} \quad \text{Expression 3}$$

For example, when Vf27=24 V and Vf1=20 V, $\Delta V_{PGM1}=4$ V according to Expression 2. When $V_{PASS1}=10$ V, $V_{PASS2}=6$ V according to Expression 3.

A reference voltage $V_{SS4}$ is applied to the selected bit line BL0, and a write inhibit voltage $V_{INHIBIT}$ is applied to the non-selected bit lines BL1 and BL2. The reference voltage $V_{SS4}$ is, for example, 0 V. The write inhibit voltage $V_{INHIBIT}$ is, for example, 5 V.

A reference voltage $V_{SS3}$ is applied to the selected source side select gate line SGS, a select voltage $V_{SGD}$ is applied to the selected drain side select gate line SGD0, and a reference voltage $V_{SS2}$ is applied to the non-selected drain side select gate lines SGD1 to SGD3. The reference voltage $V_{SS3}$ is, for example, 0 V. The select voltage $V_{SGD}$ is, for example, 2.5 V. The reference voltage $V_{SS2}$ is, for example, 0 V.

At this time, the select transistors ST1_1 and ST1_2 corresponding to the non-selected bit lines BL1 and BL2 or the non-selected drain side select gate lines SGD1 to SGD3 are turned off, and the non-selected memory strings MS_1 and MS_2 enter a floating state. The non-selected memory strings MS_1 and MS_2 may be boosted to a predetermined voltage $V_{BOOST2}$ by being coupled to the non-selected word lines WL0 and WL2 to WL63. The predetermined voltage $V_{BOOST2}$ is a voltage corresponding to the transfer voltage $V_{PASS2}$ of the non-selected word lines WL1 to WL63, and may be substantially equal to the transfer voltage $V_{PASS2}$ as shown in Expression 4.

$$V_{BOOST2} \approx V_{PASS2} \quad \text{Expression 4}$$

According to Expression 4, the memory cells MT0_1 and MT0_2 corresponding to an intersection position between the selected word line WL0 and the non-selected memory strings MS_1 and MS_2 receive program disturbance according to a voltage difference $\Delta V_{DISTURB2}$ between the program voltage $V_{PGM}$ and the predetermined voltage $V_{BOOST2}$. The following Expression 5 is established for the voltage difference $\Delta V_{DISTURB2}$.

$$\Delta V_{DISTURB2} = V_{PGM1} - V_{BOOST2} \approx V_{PGM1} - V_{PASS2} \quad \text{Expression 5}$$

For example, when $V_{PGM}=20$ V and $V_{PASS2}=6$ V, the voltage difference $\Delta V_{DISTURB2} \approx 14$ V according to Expression 5.

Due to the program disturbance according to the voltage difference $\Delta V_{DISTURB2}$, the state ST0 in an erase state may be shifted from a state indicated by a dotted line to a state indicated by a solid line in FIG. 8B in the threshold voltage distribution of the memory cell into which data is written in the SLC mode. For example, the state ST0 in the erase state may be shifted to the high voltage side by a shift amount $V_{PD2}$ corresponding to the voltage difference $\Delta V_{DISTURB2}$ (for example, 14 V).

That is, as compared with a case in which data is written into the memory cell MT1_0 in the TLC mode, when data is written into the memory cell MT0_0 in the SLC mode, the program voltage $V_{PGM}$ is lower by $\Delta V_{PGM1}$ shown in Expression 2, and the transfer voltage is also lowered by approximately $\Delta V_{PGM1}$ to $V_{PASS2}$. As shown in Expression 5, the changes in both are offset, and the voltage differences $\Delta V_{DISTURB2}$ of the two may be approximately the same value (for example, 14 V). As a result, a degree of program disturbance received by the non-selected memory cells MT0_1 and MT0_2 when data is written into the memory cell MT0_0 in the SLC mode can be made equal to a degree of program disturbance received by the non-selected memory cells MT1_1 and MT1_2 when data is written into the memory cell MT1_0 in the TLC mode.

That is, the shift amount $V_{PD1}$ of the state ST0 in the erase state in the TLC mode shown in FIG. 8A and the shift amount $V_{PD2}$ of the state ST0 in the erase state in the SLC mode shown in FIG. 8B are approximately the same, and the following Expression 6 is established.

$$V_{PD1} \approx V_{PD2} \qquad \text{Expression 6}$$

Accordingly, a voltage position of the state ST1 in the erase state after receiving the program disturbance can be made approximately the same in the TLC mode and the SLC mode. As a result, it is possible to improve the data retention characteristics in each memory cell MT, such as preventing lateral leakage of the charges from the memory cell MT into which data is written in the TLC mode to the memory cell MT into which data is written in the SLC mode.

As described above, in the embodiment, the semiconductor memory device 100 sets the value of the transfer voltage $V_{PASS2}$ when data is written into the selected memory cell MT in the SLC mode to be lower than the value of the transfer voltage $V_{PASS1}$ when data is written into the selected memory cell MT in the TLC mode. For example, the value of the transfer voltage $V_{PASS2}$ is lower than the value of the transfer voltage $V_{PASS1}$ (for example, approximately by 4 V) according to the difference $\Delta V_{PGM1}$ between the verify voltage Vf27 of the state ST7 on the most step-down side in the TLC mode and the verify voltage Vf1 of the state ST1 on the most step-down side in the SLC mode. Accordingly, the program disturbance in the SLC mode and the program disturbance in the TLC mode can be made approximately the same. As a result, it is possible to improve the data retention characteristics in each memory cell MT, such as preventing lateral leakage of the charges from the memory cell MT into which data is written in the TLC mode to the memory cell MT into which data is written in the SLC mode.

Figure 9:
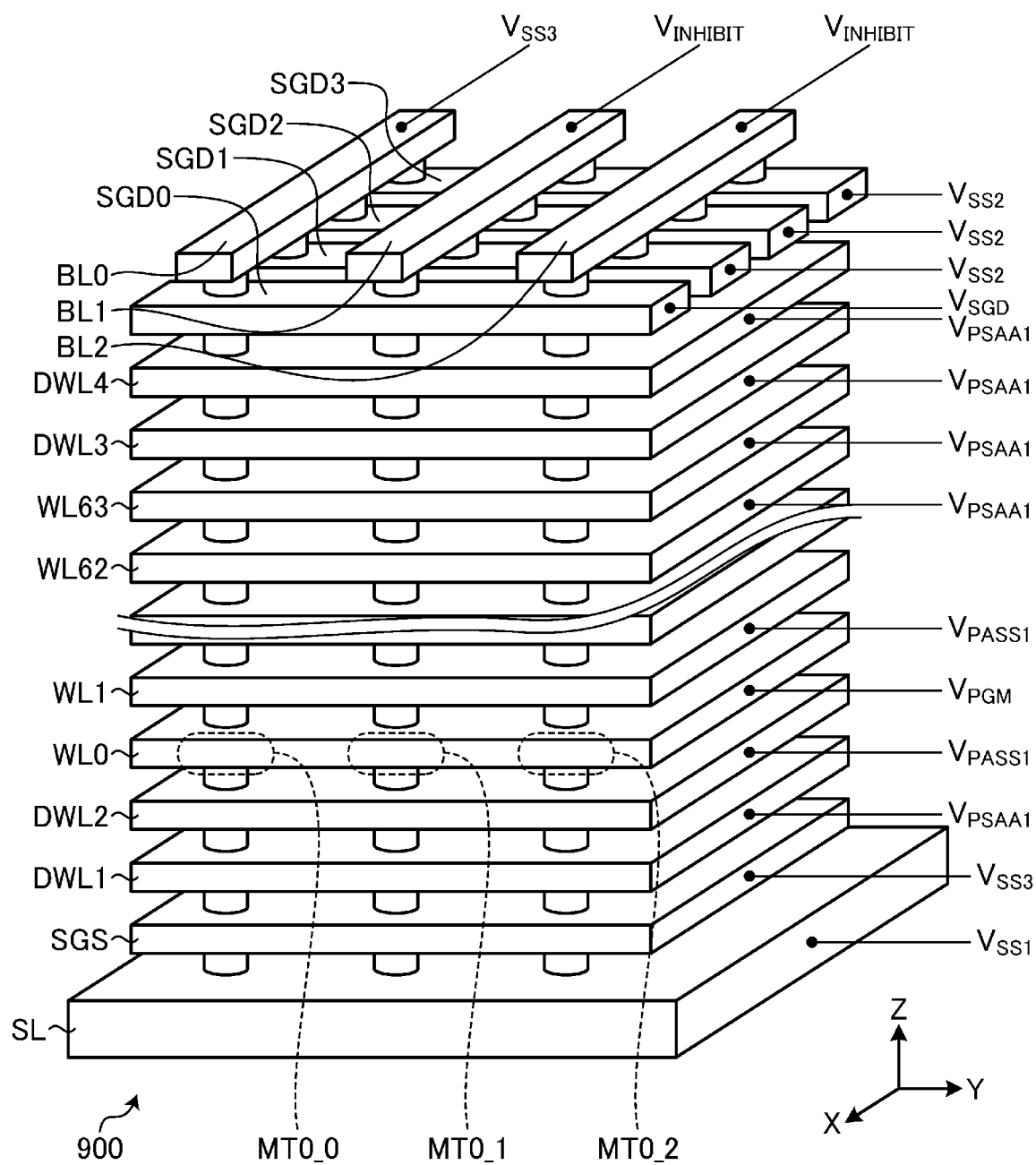
FIG. 9 is a perspective view showing an operation of the semiconductor memory device.

For example, a case is considered in which the value of the transfer voltage $V_{PASS1}$ when data is written into the selected memory cell MT in the SLC mode is made equal to the value of the transfer voltage $V_{PASS1}$ when data is written into the selected memory cell MT in the TLC mode. In this case, in a semiconductor memory device 900, a write operation in the SLC mode to the memory cells corresponding to the word lines WL0 and WL63 at both ends in the Z direction is different from the write operation in the SLC mode shown in FIG. 7 in the following points as shown in FIG. 9.

For example, when data is written into the selected memory cell MT0_0 in the SLC mode, the transfer voltage $V_{PASS1}$ applied to the non-selected word lines WL1 to WL63 and the dummy word lines DWL1 to DWL4 is the same as the transfer voltage $V_{PASS1}$ of the write operation of the TLC mode (for example, the write operation in the TLC mode shown in FIGS. 8A and 8B). In response to this, a predetermined voltage $V_{BOOST3}$ to which the non-selected memory strings MS_1 and MS_2 may be boosted by being coupled to the non-selected word lines WL0 and WL2 to WL63 is higher than that in the write operation in the SLC mode shown in FIG. 7. The predetermined voltage $V_{BOOST3}$ is a voltage corresponding to the transfer voltage $V_{PASS1}$ of the non-selected word lines WL1 to WL63, and may be substantially equal to the transfer voltage $V_{PASS1}$ as shown in Expression 7.

$$V_{BOOST3} \approx V_{PASS1} \qquad \text{Expression 7}$$

According to Expression 7, the memory cells MT0_1 and MT0_2 corresponding to an intersection position between the selected word line WL0 and the non-selected memory strings MS_1 and MS_2 receive program disturbance according to a voltage difference $\Delta V_{DISTURB3}$ between the program voltage $V_{PGM}$ and the predetermined voltage $V_{BOOST3}$. The following Expression 8 is established for the voltage difference $\Delta V_{DISTURB3}$.

$$\Delta V_{DISTURB3} = V_{PGM} - V_{BOOST3} \approx V_{PGM} - V_{PASS1} \qquad \text{Expression 8}$$

For example, when $V_{PGM}=20$ V and $V_{PASS1}=10$ V, the voltage difference $\Delta V_{DISTURB3} \approx 10$ V according to Expression 8.

Figure 10:
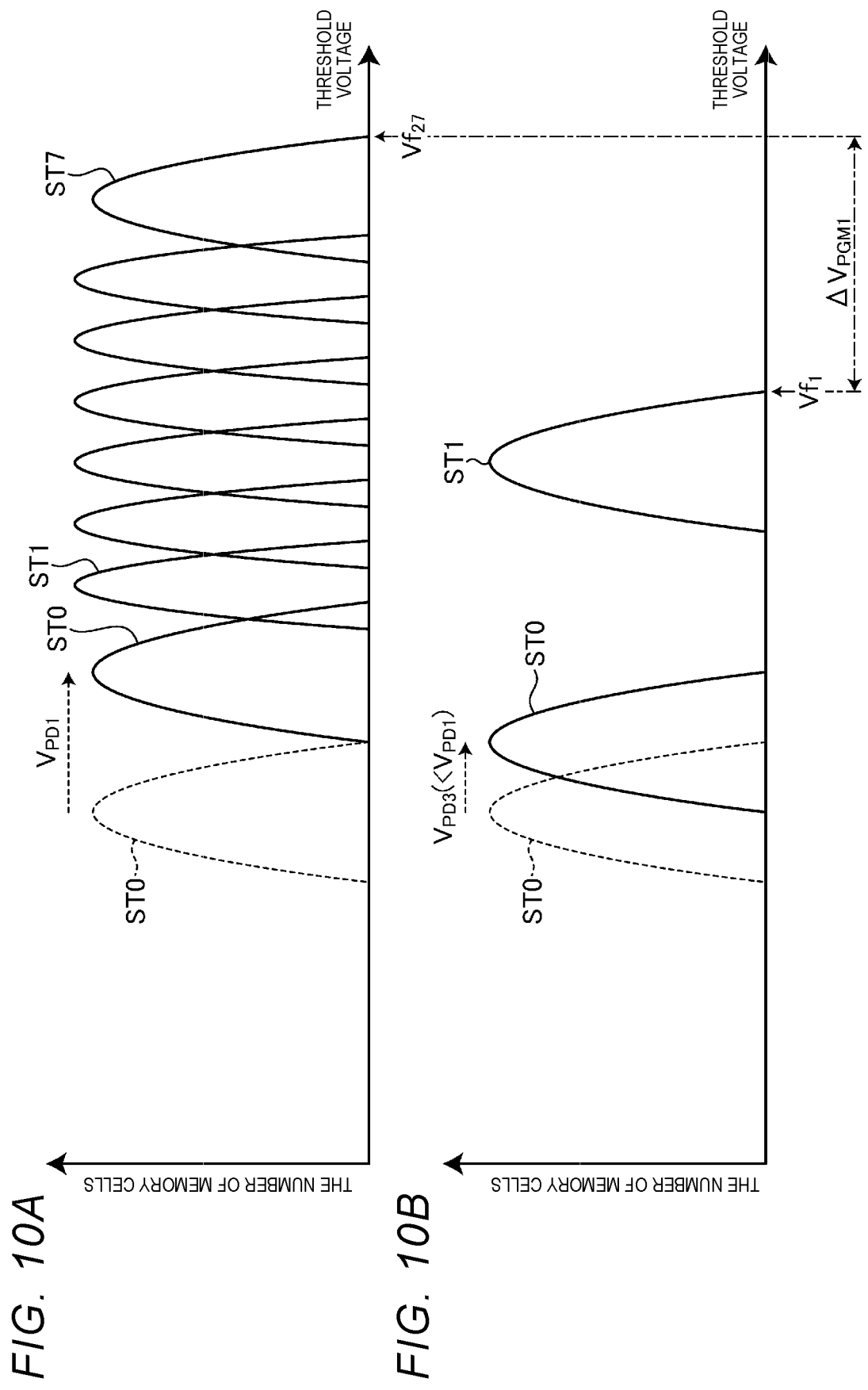
FIGS. 10A and 10B are diagrams showing a threshold voltage distribution of the memory cell array when transfer voltages at the time of writing are the same for memory cells having different numbers of bits.

Due to the program disturbance according to the voltage difference $\Delta V_{DISTURB3}$, the state ST0 in an erase state may be shifted from a state indicated by a dotted line to a state indicated by a solid line in FIG. 10B in the threshold voltage distribution of the memory cell into which data is written in the SLC mode. FIGS. 10A and 10B are diagrams showing a threshold voltage distribution of the memory cell array when transfer voltages at the time of writing are the same for memory cells having different numbers of bits, and illustrates a threshold voltage distribution of the memory cell array when transfer voltages at the time of writing are the same for 3 bits (TCL mode) and 1 bit (SLC mode) memory cells.

For example, the state ST0 in the erase state may be shifted to the high voltage side by a shift amount $V_{PD3}$ corresponding to the voltage difference $\Delta V_{DISTURB3}$ (for example, 10 V).

The voltage difference $\Delta V_{DISTURB3}$ (for example, 10 V) shown in Expression 5 is smaller than the voltage difference $\Delta V_{DISTURB2}$ (for example, 14 V) shown in Expression 1. Accordingly, as shown in FIGS. 10A and 10B, the shift amount $V_{PD3}$ of the state ST0 in the erase state in the SLC mode is smaller than the shift amount $V_{PD1}$ of the state ST0 in the erase state in the TLC mode. In the state after the shift, the state ST0 in the erase state in the SLC mode is on the lower voltage side than the state ST0 in the erase state in the TLC mode.

Figure 11:
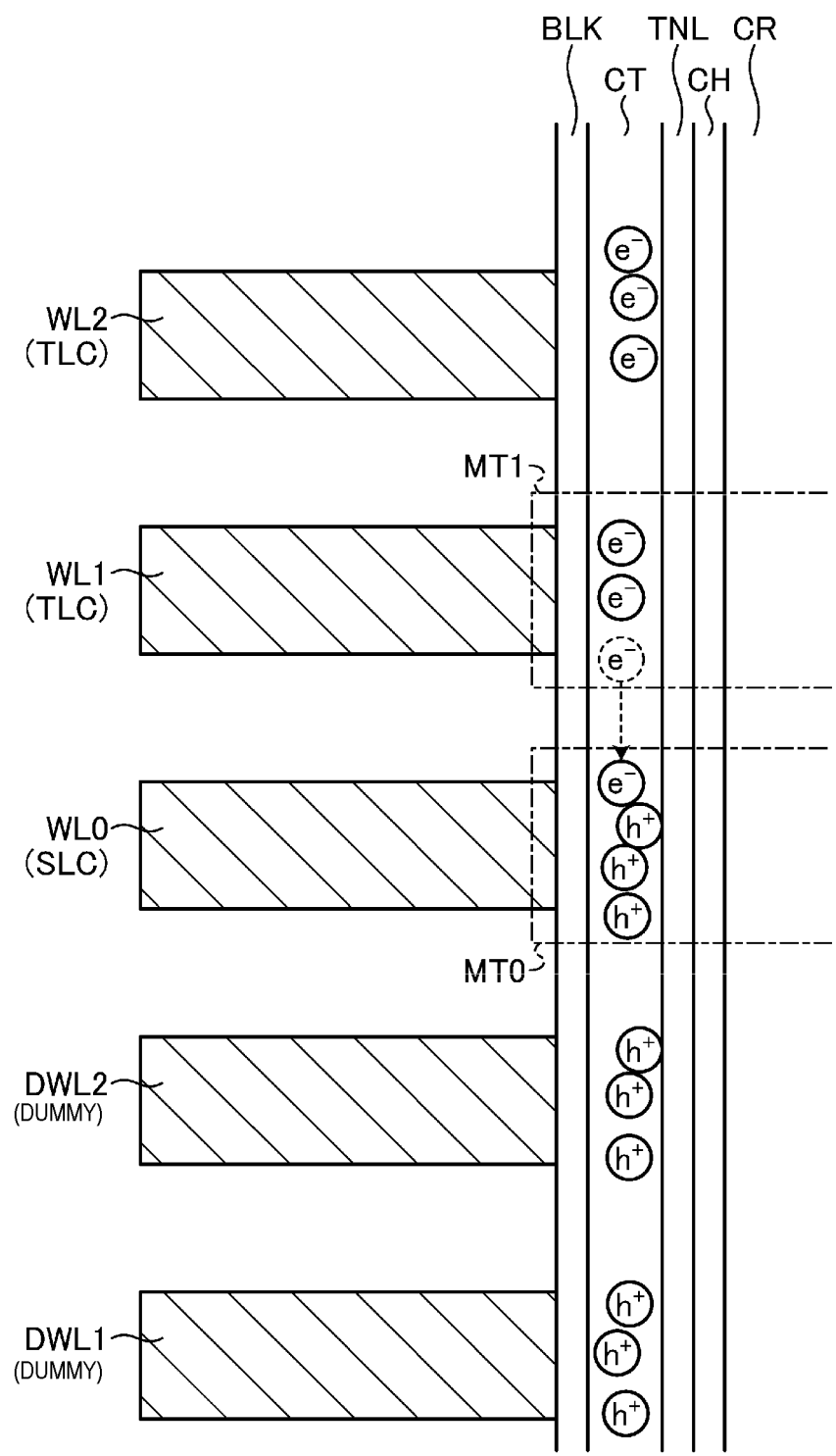
FIG. 11 is a sectional view showing lateral leakage of charges.

As a result, the lateral leakage of the charges is likely to occur as shown in FIG. 11. FIG. 11 is a sectional view showing the lateral leakage of charges. In FIG. 11, for the sake of simplicity, the insulating layer between the conductive layers WL is not shown.

For example, it is assumed that the memory cell MT1 corresponding to the word line WL1 and the memory cell MT0 corresponding to the word line WL0 are adjacent to each other in the Z direction, the memory cell MT1 is programmed to the state ST7 (see FIG. 10A), and the memory cell MT0 is in the state ST0 (see FIG. 10B) in the erase state. An electric field due to a difference in the stored charge amount is generated between the charge storage film CT of the memory cell MT1 and the charge storage film CT of the memory cell MT0. Since the electric field is larger because the state ST0 in the erase state in the SLC mode is on the lower voltage side than the state ST0 in the erase state in the TLC mode, the electrons may easily leak from the memory cell MT1 to the memory cell MT0 as shown by a dotted line in FIG. 11. As a result, the data retention characteristics of the memory cell MT1 may deteriorate, such as the information stored in the memory cell MT1 being lost.

On the other hand, in the embodiment, the semiconductor memory device 100 sets the value of the transfer voltage $V_{PASS2}$ when data is written into the selected memory cell MT in the SLC mode to be lower than the value of the transfer voltage $V_{PASS1}$ when data is written into the selected memory cell MT in the TLC mode. Accordingly, the program disturbance in the SLC mode and the program disturbance in the TLC mode can be made approximately the same. As a result, it is possible to improve the data retention characteristics in each memory cell MT, such as preventing lateral leakage of the charges from the memory cell MT into which data is written in the TLC mode to the memory cell MT into which data is written in the SLC mode.

The idea of the embodiment is applicable to any operation mode in which data is written into the memory cells MT corresponding to the word lines WL at both ends in the Z direction in each block BLK of the memory cell array 130 in the SLC mode and the memory cells MT corresponding to the word lines WL on the inner side have a larger number of bits than in the SLC mode.

For example, the idea of the embodiment may be applied to an operation mode in which data is written into the memory cells MT corresponding to the word lines WL0 and WL63 at both ends in the Z direction among the plurality of word lines WL0 to WL63 (see FIG. 2) in the SLC mode, and data is written into the memory cells MT corresponding to the word lines WL1 to WL62 on the inner side in the MLC mode.

Alternatively, as a first modification example of the embodiment, the idea of the embodiment may be applied to an operation mode in which data is written into the memory cells MT corresponding to the word lines WL0 and WL63 at both ends in the Z direction among the plurality of word lines WL0 to WL63 (see FIG. 2) in the SLC mode, and data is written into the memory cells MT corresponding to the word lines WL1 to WL62 on the inner side in the QLC mode.

In this case, a value of a transfer voltage $V_{PASS4}$ when data is written into the selected memory cell MT in the SLC mode is lower than the value of the transfer voltage $V_{PASS1}$ when data is written into the selected memory cell MT in the QLC mode.

For example, in a write operation in the QLC mode to the memory cells MT corresponding to the word lines WL1 to WL62 on the inner side, the same voltage application as in FIG. 6 is performed.

At this time, the memory cells MT1_1 and MT1_2 corresponding to an intersection position between the selected word line WL1 and the non-selected memory strings MS_1 and MS_2 receive program disturbance according to a voltage difference $\Delta V_{DISTURB1}$ between the program voltage $V_{PGM}$ and the predetermined voltage $V_{BOOST1}$. Expression 1 is established for the voltage difference $\Delta V_{DISTURB1}$. The program voltage $V_{PGM}$ may be substantially equal to the verify voltage Vf45 of the state ST15 on the highest voltage side in the QLC mode as shown in FIG. 12A. FIGS. 12A and 12B are diagrams showing a threshold voltage distribution of a memory cell array in the first modification example of the embodiment. For example, when $V_{PGM}$=Vf45=26 V and $V_{PASS1}$=10 V, the voltage difference $\Delta V_{DISTURB1} \approx 16$ V according to Expression 1.

In addition, in the write operation in the SLC mode to the memory cells MT corresponding to the word lines WL0 and WL63 at both ends in the Z direction, the same voltage application as that in which the transfer voltage $V_{PASS2}$ is replaced with the transfer voltage $V_{PASS4}$ in FIG. 7 is performed. The transfer voltage $V_{PASS4}$ is lower than the transfer voltage $V_{PASS1}$. As shown in Expression 9 and Expression 10, the transfer voltage $V_{PASS4}$ may be lower than the transfer voltage $V_{PASS1}$ according to a difference $\Delta V_{PGM2}$ between the verify voltage Vf45 and the verify voltage Vf1 (see FIGS. 12A and 12B).

$$\Delta V_{PGM2} = Vf45 - Vf1 \qquad \text{Expression 9}$$

$$V_{PASS4} = V_{PASS1} - \Delta V_{PGM2} \qquad \text{Expression 10}$$

For example, when Vf45=26 V and Vf1=20 V, $\Delta V_{PGM2}$=6 V according to Expression 9. When $V_{PASS1}$=10 V, $V_{PASS4}$=4 V according to Expression 10.

At this time, the select transistors ST1_1 and ST1_2 corresponding to the non-selected bit lines BL1 and BL2 or the non-selected drain side select gate lines SGD1 to SGD3 are turned off, and the non-selected memory strings MS_1 and MS_2 enter a floating state. The non-selected memory strings MS_1 and MS_2 may be boosted to a predetermined voltage $V_{BOOST4}$ by being coupled to the non-selected word lines WL0 and WL2 to WL63. The predetermined voltage $V_{BOOST4}$ is a voltage corresponding to the transfer voltage $V_{PASS4}$ of the non-selected word lines WL1 to WL63, and may be substantially equal to the transfer voltage $V_{PASS4}$ as shown in Expression 11.

$$V_{BOOST4} \approx V_{PASS4} \qquad \text{Expression 11}$$

According to Expression 11, the memory cells MT0_1 and MT0_2 corresponding to an intersection position between the selected word line WL0 and the non-selected memory strings MS_1 and MS_2 receive program disturbance according to a voltage difference $\Delta V_{DISTURB4}$ between the program voltage $V_{PGM}$ and the predetermined voltage $V_{BOOST4}$. The following Expression 12 is established for the voltage difference $\Delta V_{DISTURB4}$.

$$\Delta V_{DISTURB4} = V_{PGM} - V_{BOOST4} \approx V_{PGM} - V_{PASS4} \quad \text{Expression 12}$$

For example, when $V_{PGM}=20$ V and $V_{PASS4}=4$ V, the voltage difference $\Delta V_{DISTURB4} \approx 16$ V according to Expression 12. The value of the voltage difference $\Delta V_{DISTURB4}$ shown in Expression 12 may be approximately the same as the value of the voltage difference $\Delta V_{DISTURB1}$ shown in Expression 1.

By such an operation, the program disturbance in the SLC mode and the program disturbance in the QLC mode can be made approximately the same. As a result, it is possible to improve the data retention characteristics in each memory cell MT, such as preventing lateral leakage of the charges from the memory cell MT into which data is written in the QLC mode to the memory cell MT into which data is written in the SLC mode.

Alternatively, as a second modification example of the embodiment, the idea of the embodiment may be applied to an operation mode in which data is written into the memory cells MT corresponding to the word lines WL0 and WL63 at both ends in the Z direction among the plurality of word lines WL0 to WL63 (see FIG. 2) in the SLC mode, and data is written into the memory cells MT corresponding to the word lines WL1 to WL62 on the inner side in the PLC mode.

In this case, a value of a transfer voltage $V_{PASS5}$ when data is written into the selected memory cell MT in the SLC mode is lower than the value of the transfer voltage $V_{PASS1}$ when data is written into the selected memory cell MT in the PLC mode.

For example, in a write operation in the PLC mode to the memory cells MT corresponding to the word lines WL1 to WL62 on the inner side, the same voltage application as in FIG. 6 is performed.

Figure 13A:
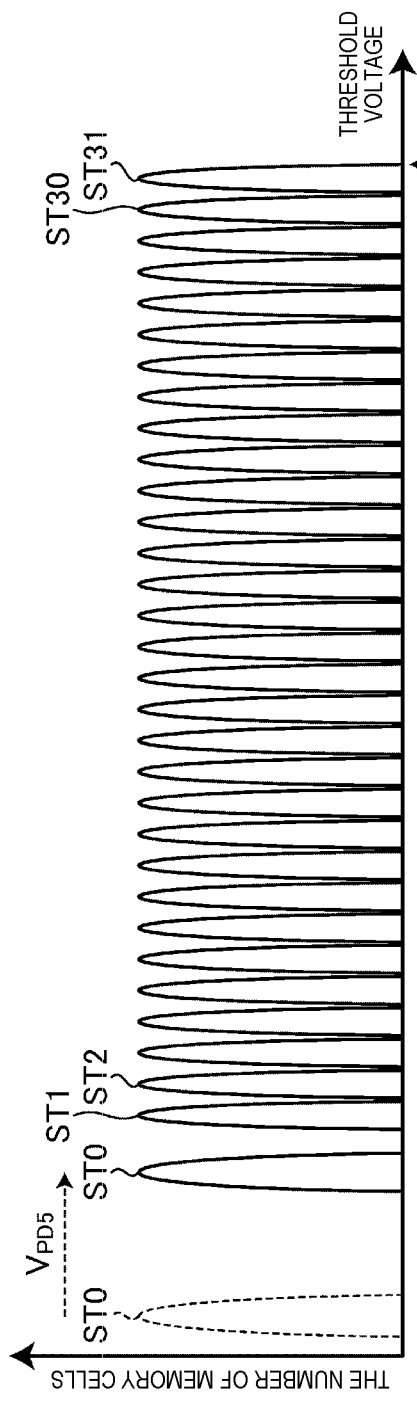
FIGS. 13A and 13B are diagrams showing a threshold voltage distribution of a memory cell array in a second modification example of the embodiment.
Figure 13B:
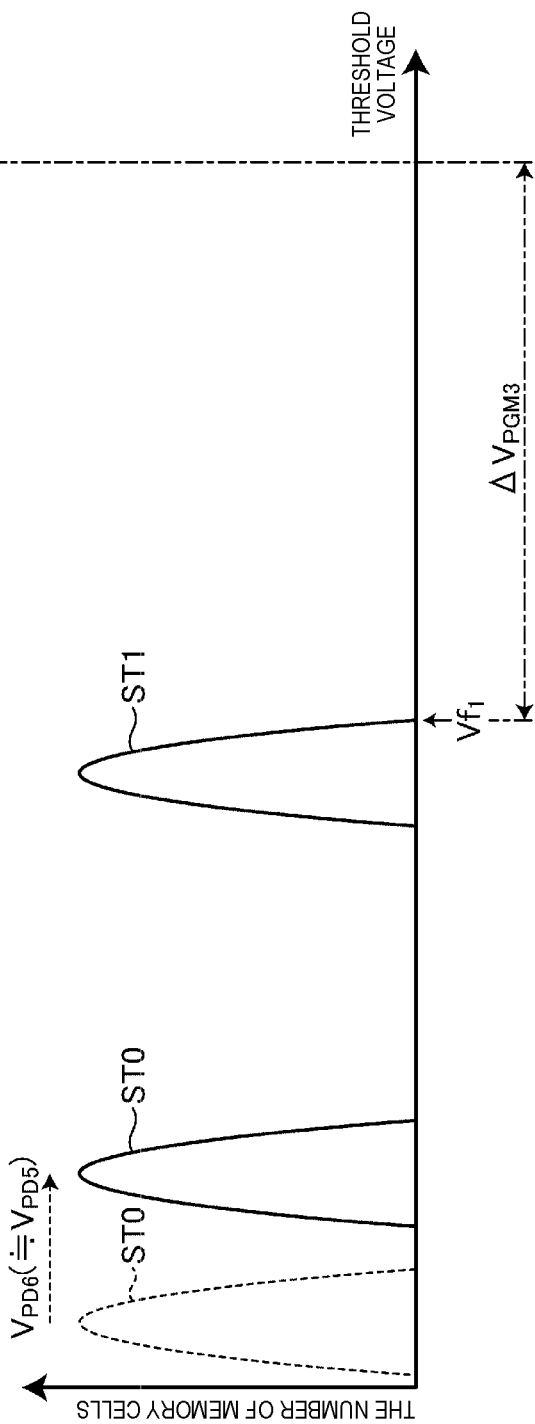

At this time, the memory cells MT1_1 and MT1_2 corresponding to an intersection position between the selected word line WL1 and the non-selected memory strings MS_1 and MS_2 receive program disturbance according to a voltage difference $\Delta V_{DISTURB1}$ between the program voltage $V_{PGM}$ and the predetermined voltage $V_{BOOST1}$. Expression 1 is established for the voltage difference $\Delta V_{DISTURB1}$. The program voltage $V_{PGM}$ may be substantially equal to the verify voltage Vf81 of the state ST31 on the highest voltage side in the PLC mode as shown in FIG. 13A. FIGS. 13A and 13B are diagrams showing a threshold voltage distribution of a memory cell array in the second modification example of the embodiment. For example, when $V_{PGM}=Vf81=28$ V and $V_{PASS1}=10$ V, the voltage difference $\Delta V_{DISTURB1} \approx 18$ V according to Expression 1.

In addition, in the write operation in the SLC mode to the memory cells MT corresponding to the word lines WL0 and WL63 at both ends in the Z direction, the same voltage application as that in which the transfer voltage $V_{PASS2}$ is replaced with the transfer voltage $V_{PASS5}$ in FIG. 7 is performed. The transfer voltage $V_{PASS5}$ is lower than the transfer voltage $V_{PASS1}$. As shown in Expression 13 and Expression 14, the transfer voltage $V_{PASS4}$ may be lower than the transfer voltage $V_{PASS1}$ according to a difference $\Delta V_{PGM3}$ between the verify voltage Vf81 and the verify voltage Vf1 (see FIGS. 13A and 13B).

$$\Delta V_{PGM3} = Vf81 - Vf1 \quad \text{Expression 13}$$

$$V_{PASS5} = V_{PASS1} - \Delta V_{PGM3} \quad \text{Expression 14}$$

For example, when Vf81=28 V and Vf1=20 V, $\Delta V_{PGM3}=8$ V according to Expression 13. When $V_{PASS1}=10$ V, $V_{PASS4}=2$ V according to Expression 14.

At this time, the select transistors ST1_1 and ST1_2 corresponding to the non-selected bit lines BL1 and BL2 or the non-selected drain side select gate lines SGD1 to SGD3 are turned off, and the non-selected memory strings MS_1 and MS_2 enter a floating state. The non-selected memory strings MS_1 and MS_2 may be boosted to a predetermined voltage $V_{BOOST5}$ by being coupled to the non-selected word lines WL0 and WL2 to WL63. The predetermined voltage $V_{BOOST5}$ is a voltage corresponding to the transfer voltage $V_{PASS5}$ of the non-selected word lines WL1 to WL63, and may be substantially equal to the transfer voltage $V_{PASS5}$ as shown in Expression 15.

$$V_{BOOST5} \approx V_{PASS5} \quad \text{Expression 15}$$

According to Expression 15, the memory cells MT0_1 and MT0_2 corresponding to an intersection position between the selected word line WL0 and the non-selected memory strings MS_1 and MS_2 receive program disturbance according to a voltage difference $\Delta V_{DISTURB5}$ between the program voltage $V_{PGM}$ and the predetermined voltage $V_{BOOST5}$. The following Expression 16 is established for the voltage difference $\Delta V_{DISTURB5}$.

$$\Delta V_{DISTURB5} = V_{PGM} - V_{BOOST5} \approx V_{PGM} - V_{PASS5} \quad \text{Expression 16}$$

For example, when $V_{PGM}=20$ V and $V_{PASS5}=2$ V, the voltage difference $\Delta V_{DISTURB5} \approx 18$ V according to Expression 16. The value of the voltage difference $\Delta V_{DISTURB4}$ shown in Expression 16 may be approximately the same as the value of the voltage difference $\Delta V_{DISTURB1}$ shown in Expression 1.

By such an operation, the program disturbance in the SLC mode and the program disturbance in the PLC mode can be made approximately the same. As a result, it is possible to improve the data retention characteristics in each memory cell MT, such as preventing lateral leakage of the charges from the memory cell MT into which data is written in the PLC mode to the memory cell MT into which data is written in the SLC mode.

Alternatively, as a third modification example of the embodiment, the idea of the embodiment may be applied to a memory cell array 130i including a columnar body 12i in which a plurality of tiers are stacked.

Figure 14:
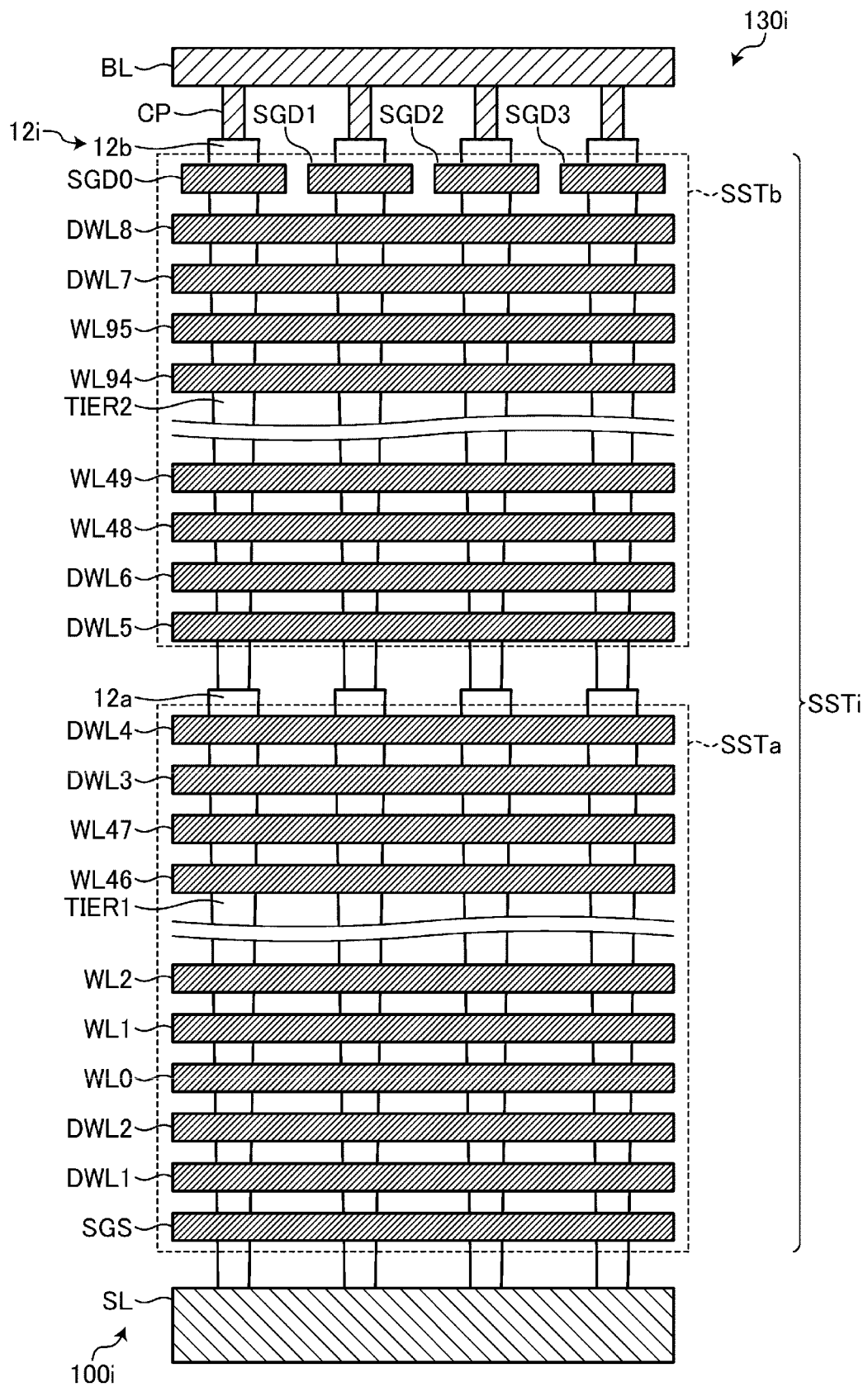
FIG. 14 is a sectional view showing a configuration of a memory cell array in a third modification example of the embodiment.

For example, in the memory cell array 130i of a semiconductor memory device 100i shown in FIG. 14, a stacked body SSTi is stacked above the source line SL. FIG. 14 is a sectional view showing a configuration of the memory cell array 130i.

In the stacked body SSTi, the select gate line SGS, the dummy word lines DWL1 and DWL2, the plurality of word lines WL0 to WL47, the dummy word lines DWL3 to DWL6, the plurality of word lines WL48 to WL95, the dummy word lines DWL7 and DWL8, and the select gate line SGD (any of SGD0 to SGD3) are stacked apart from each other. A columnar body 4 extending in the stacking direction penetrates the select gate line SGS, the dummy word lines DWL1 and DWL2, the plurality of word lines WL0 to WL47, the dummy word lines DWL3 to DWL6, the plurality of word lines WL48 to WL95, the dummy word lines DWL7 and DWL8, and the select gate line SGD in the stacked body SSTi. The columnar body 4 has a structure in which a plurality of tiers 4a and 4b are stacked. In correspondence to this, the stacked body SSTi has a structure in which a plurality of stacked bodies SSTa and SSTb are stacked. In FIG. 14, a structure in which the columnar body 4 is divided into two tiers 4a and 4b and the stacked body SST is divided into two stacked bodies SSTa and SSTb is exemplified, but the columnar body 4 may be divided into three or more, and the stacked body SST may be divided into three or more.

In the stacked body SSTa, the select gate line SGS, the dummy word lines DWL1 and DWL2, the plurality of word lines WL0 to WL47, and the dummy word lines DWL3 and DWL4 are stacked apart from each other. In the stacked body SSTa, the word lines WL0 and WL47 at both ends in the Z direction are different from the word lines WL1 to WL46 on the inner side, and the adjacent word lines WL exist only on one side in the Z direction. Therefore, the word lines WL0 and WL47 at both ends in the Z direction are more susceptible to the electric field when a program voltage is applied to the other word lines WL than the word lines WL1 to WL46 on the inner side.

In the stacked body SSTb, the dummy word lines DWL5 and DWL6, the plurality of word lines WL48 to WL95, the dummy word lines DWL7 and DWL8, and the select gate line SGD are stacked apart from each other. In the stacked body SSTb, the word lines WL48 and WL95 at both ends in the Z direction are different from the word lines WL49 to WL94 on the inner side, and the adjacent word lines WL exist only on one side in the Z direction. Therefore, the word lines WL48 and WL95 at both ends in the Z direction are more susceptible to the electric field when a program voltage is applied to the other word lines WL than the word lines WL49 to WL94 on the inner side.

In consideration of this point, the semiconductor memory device 100i has an operation mode as shown in FIG. 15. FIG. 15 is a diagram showing an operation mode of the semiconductor memory device 100i.

In a first mode, data is written into the memory cells corresponding to the word lines WL1 to WL46 inside the stacked body SSTa and the memory cells corresponding to the word lines WL49 to WL94 inside the stacked body SSTb in the TLC mode, and data is written into the memory cells corresponding to the word lines WL0 and WL47 at both ends of the stacked body SSTa in the Z direction and the memory cells corresponding to the word lines WL48 and WL95 at both ends of the stacked body SSTb in the Z direction in the SLC mode.

At this time, data is also written into the memory cells corresponding to the dummy word lines DWL1 and DWL2 on the −Z side of the word lines WL0 to WL47 in the stacked body SSTa in the SLC mode, and the data capacity corresponding to the TLC mode can be achieved in the memory cells corresponding to the dummy word lines DWL1 and DWL2 and the word line WL0. Data is also written into the memory cells corresponding to the dummy word lines DWL3 and DWL4 on the +Z side of the word lines WL0 to WL47 in the SLC mode, and the data capacity corresponding to the TLC mode can be achieved in the memory cells corresponding to the word line WL47 and the dummy word lines DWL3 and DWL4.

Similarly, data is also written into the memory cells corresponding to the dummy word lines DWL5 and DWL6 on the −Z side of the word lines WL48 to WL95 in the stacked body SSTb in the SLC mode, and the data capacity corresponding to the TLC mode can be achieved in the memory cells corresponding to the dummy word lines DWL5 and DWL6 and the word line WL48. Data is also written into the memory cells corresponding to the dummy word lines DWL7 and DWL8 on the +Z side of the word lines WL48 to WL95 in the SLC mode, and the data capacity corresponding to the TLC mode can be achieved in the memory cells corresponding to the word line WL95 and the dummy word lines DWL7 and DWL8.

In a second mode, data is written into the memory cells corresponding to the word lines WL1 to WL46 on the inner side in the stacked body SSTa in the TLC mode, and data is written into the memory cells corresponding to the word lines WL0 and WL47 at both ends in the Z direction in the SLC mode. At this time, data is not written into the memory cells corresponding to the dummy word lines DWL1 and DWL2 on the −Z side of the word lines WL0 to WL47. Data is not written into the memory cells corresponding to the dummy word lines DWL3 and DWL4 on the +Z side of the word lines WL0 to WL47.

Similarly, data is written into the memory cells corresponding to the word lines WL49 to WL94 on the inner side in the stacked body SSTb in the TLC mode, and data is written into the memory cells corresponding to the word lines WL48 and WL95 at both ends in the Z direction in the SLC mode. At this time, data is not written into the memory cells corresponding to the dummy word lines DWL5 and DWL6 on the −Z side of the word lines WL48 to WL95. Data is not written into the memory cells corresponding to the dummy word lines DWL7 and DWL8 on the +Z side of the word lines WL48 to WL95.

In both the first mode and the second mode, data is written into the memory cells MT corresponding to the word lines WL0, WL47, WL48, and WL95 at both ends in the Z direction in each of the stacked bodies SSTa and SSTb among the plurality of word lines WL0 to WL95 in the SLC mode, and data is written into the memory cells MT corresponding to the word lines WL1 to WL46 and WL49 to WL94 on the inner side in the TLC mode.

Figure 17:
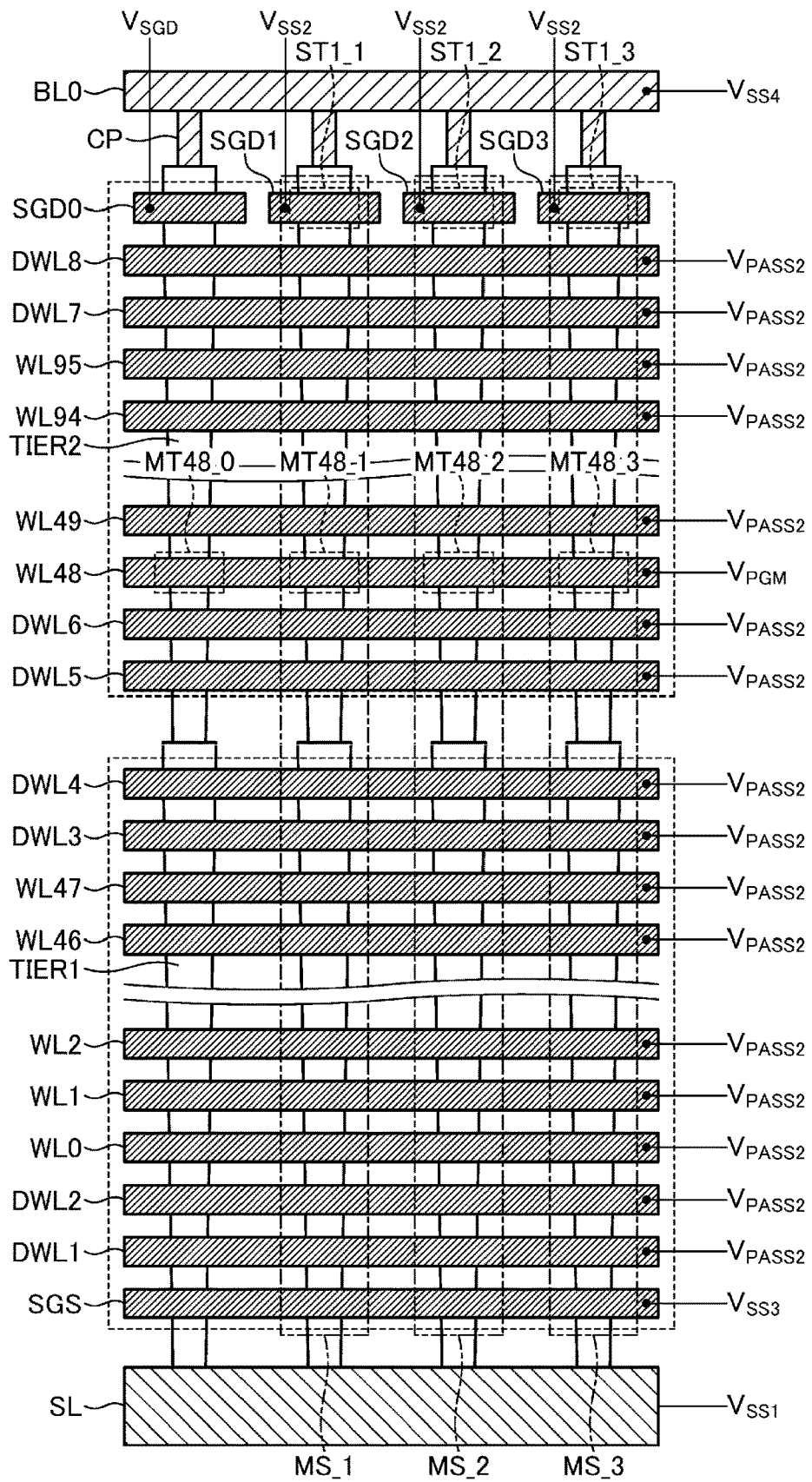
FIG. 17 is a sectional view showing an operation of the semiconductor memory device according to the third modification example of the embodiment.

In response to this, the semiconductor memory device 100i performs a write operation as shown in FIGS. 16 and 17. FIG. 16 and FIG. 17 are perspective views showing the operation of the semiconductor memory device 100i.

FIG. 16 shows a write operation in the TLC mode to the memory cells corresponding to the word lines WL1 to WL46 on the inner side in the stacked body SSTa or the memory cells corresponding to the word lines WL49 to WL94 on the inner side in the stacked body SSTb. For example, when data is written into the selected memory cell MT49_0 corresponding to the selected word line WL49 in the TLC mode, a program voltage $V_{PGM}$ is applied to the selected word line WL49, and a transfer voltage $V_{PASS1}$ is applied to the non-selected word lines WL0 to WL48 and WL50 to WL95 and the dummy word lines DWL1 to DWL8. The program voltage $V_{PGM}$ is substantially equal to, for example, a verify voltage Vf27 (refer to FIGS. 8A and 8B) of the state ST7 on the highest voltage side in the TLC mode. The verify voltage Vf27 of the state ST7 in the TLC mode is, for example, 24 V. The transfer voltage $V_{PASS1}$ is, for example, 10 V. A reference voltage $V_{SS4}$ is applied to the selected bit line BL0, and a write inhibit voltage $V_{INHIBIT}$ is applied to the non-selected bit lines BL1 and BL2 (see FIG. 6). The reference voltage $V_{SS4}$ is, for example, 0 V. The write inhibit voltage $V_{INHIBIT}$ is, for example, 5 V.

A reference voltage $V_{SS3}$ is applied to the selected source side select gate line SGS, a select voltage $V_{SGD}$ is applied to the selected drain side select gate line SGD0, and a reference voltage $V_{SS2}$ is applied to the non-selected drain side select gate lines SGD1 to SGD3. The reference voltage $V_{SS3}$ is, for example, 0 V. The select voltage $V_{SGD}$ is, for example, 2.5 V. The reference voltage $V_{SS2}$ is, for example, 0 V.

At this time, the select transistors ST1_1 and ST1_2 corresponding to the non-selected bit lines BL1 and BL2 (see FIG. 6) or the non-selected drain side select gate lines SGD1 to SGD3 are turned off, and for example, the non-selected memory strings MS_1, MS_2, and MS_3 enter a floating state. The non-selected memory strings MS_1, MS_2, and MS_3 may be boosted to a predetermined voltage $V_{BOOST1}$ by being coupled to the non-selected word lines WL0 to WL48 and WL50 to WL95. The predetermined voltage $V_{BOOST1}$ is a voltage corresponding to the transfer voltage $V_{PASS1}$ of the non-selected word lines WL0 to WL48 and WL50 to WL95, and may be substantially equal to the transfer voltage $V_{PASS1}$. Accordingly, the memory cells MT49_1, MT49_2, and MT49_3 corresponding to an intersection position between the selected word line WL49 and the non-selected memory strings MS_1, MS_2, and MS_3 receive program disturbance according to a voltage difference $\Delta V_{DISTURB1}$ between the program voltage $V_{PGM}$ and the predetermined voltage $V_{BOOST1}$. Expression 1 is established for the voltage difference $\Delta V_{DISTURB1}$.

For example, when $V_{PGM}=24$ V and $V_{PASS1}=10$ V, the voltage difference $\Delta V_{DISTURB1} \approx 14$ V according to Expression 1.

Due to the program disturbance according to the voltage difference $\Delta V_{DISTURB1}$, the state ST0 in an erase state may be shifted from a state indicated by a dotted line to a state indicated by a solid line in FIG. 8A in the threshold voltage distribution of the memory cell into which data is written in the TLC mode. For example, the state ST0 in the erase state may be shifted to the high voltage side by a shift amount $V_{PD1}$ corresponding to the voltage difference $\Delta V_{DISTURB1}$ (for example, 14 V).

FIG. 17 shows a write operation to the memory cells corresponding to the word lines WL0 and WL47 at both ends in the Z direction in the stacked body SSTa or the memory cells corresponding to the word lines WL48 and WL95 at both ends in the Z direction in the stacked body SSTb. For example, when data is written into the selected memory cell MT48_0 corresponding to the selected word line WL48 in the SLC mode, a program voltage $V_{PGM}$ is applied to the selected word line WL48, and a transfer voltage $V_{PASS2}$ is applied to the non-selected word lines WL0 to WL47 and WL49 to WL95 and the dummy word lines DWL1 to DWL8. The program voltage $V_{PGM}$ is substantially equal to, for example, a verify voltage Vf1 (refer to FIGS. 8A and 8B) of the state ST1 on the highest voltage side in the SLC mode. The verify voltage Vf1 of the state ST1 in the SLC mode is, for example, 20 V. The transfer voltage $V_{PASS2}$ is lower than the transfer voltage $V_{PASS1}$. As shown in Expression 2 and Expression 3, the transfer voltage $V_{PASS2}$ may be lower than the transfer voltage $V_{PASS1}$ according to a difference $\Delta V_{PGM1}$ between the verify voltage Vf27 and the verify voltage Vf1.

For example, when Vf27=24 V and Vf1=20 V, $\Delta V_{PGM1}=4$ V according to Expression 2. When $V_{PASS1}=10$ V, $V_{PASS2}=6$ V according to Expression 3.

A reference voltage $V_{SS4}$ is applied to the selected bit line BL0, and a write inhibit voltage $V_{INHIBIT}$ is applied to the non-selected bit lines BL1 and BL2 (see FIG. 7). The reference voltage $V_{SS4}$ is, for example, 0 V. The write inhibit voltage $V_{INHIBIT}$ is, for example, 5 V.

A reference voltage $V_{SS3}$ is applied to the selected source side select gate line SGS, a select voltage $V_{SGD}$ is applied to the selected drain side select gate line SGD0, and a reference voltage $V_{SS2}$ is applied to the non-selected drain side select gate lines SGD1 to SGD3. The reference voltage $V_{SS3}$ is, for example, 0 V. The select voltage $V_{SGD}$ is, for example, 2.5 V. The reference voltage $V_{SS2}$ is, for example, 0 V.

At this time, the select transistors ST1_1 and ST1_2 corresponding to the non-selected bit lines BL1 and BL2 or the non-selected drain side select gate lines SGD1 to SGD3 are turned off, and the non-selected memory strings MS_1 and MS_2 enter a floating state. The non-selected memory strings MS_1 and MS_2 may be boosted to a predetermined voltage $V_{BOOST2}$ by being coupled to the non-selected word lines WL48 and WL2 to WL63. The predetermined voltage $V_{BOOST2}$ is a voltage corresponding to the transfer voltage $V_{PASS2}$ of the non-selected word lines WL0 to WL47 and WL49 to WL95, and may be substantially equal to the transfer voltage $V_{PASS2}$ as shown in Expression 4.

According to Expression 4, the memory cells MT48_1, MT48_2, and MT48_3 corresponding to an intersection position between the selected word line WL48 and the non-selected memory strings MS_1, MS_2, and MS_3 receive program disturbance according to a voltage difference $\Delta V_{DISTURB2}$ between the program voltage $V_{PGM}$ and the predetermined voltage $V_{BOOST2}$. Expression 5 is established for the voltage difference $\Delta V_{DISTURB2}$.

For example, when $V_{PGM}=20$ V and $V_{PASS2}=6$ V, the voltage difference $\Delta V_{DISTURB2} \approx 14$ V according to Expression 5.

Due to the program disturbance according to the voltage difference $\Delta V_{DISTURB2}$, the state ST0 in an erase state may be shifted from a state indicated by a dotted line to a state indicated by a solid line in FIG. 8B in the threshold voltage distribution of the memory cell into which data is written in the SLC mode. For example, the state ST0 in the erase state may be shifted to the high voltage side by a shift amount $V_{PD2}$ corresponding to the voltage difference $\Delta V_{DISTURB2}$ (for example, 14 V).

That is, as compared with a case in which data is written into the memory cell MT49_0 in the TLC mode, when data is written into the memory cell MT48_0 in the SLC mode, the program voltage $V_{PGM}$ is lower by $\Delta V_{PGM1}$ shown in Expression 2, and the transfer voltage is also lowered by approximately $\Delta V_{PGM1}$ to $V_{PASS2}$. As shown in Expression 5, the changes in both are offset, and the voltage differences $\Delta V_{DISTURB2}$ of the two may be approximately the same value (for example, 14 V). As a result, a degree of program disturbance received by the non-selected memory cells MT48_1, MT48_2, and MT48_3 when data is written into the memory cell MT48_0 in the SLC mode can be made equal to a degree of program disturbance received by the non-selected memory cells MT49_1, MT49_2, and MT49_3 when data is written into the memory cell MT49_0 in the TLC mode.

That is, the shift amount $V_{PD1}$ of the state ST0 in the erase state in the TLC mode shown in FIG. 8A and the shift amount $V_{PD2}$ of the state ST0 in the erase state in the SLC mode shown in FIG. 8B are approximately the same, and Expression 6 is established.

With such a configuration and operation, a voltage position of the state ST0 in the erase state after receiving the program disturbance can be made approximately the same in the TLC mode and the SLC mode. As a result, it is possible to improve the data retention characteristics in each memory cell MT, such as preventing lateral leakage of the charges from the memory cell MT into which data is written in the TLC mode to the memory cell MT into which data is written in the SLC mode.

The idea of the embodiment is applicable to any operation mode in which data is written into the memory cells MT corresponding to the word lines WL at both ends in the Z direction in each of the stacked bodies SSTa and SSTb in the SLC mode and the memory cells MT corresponding to the word lines WL on the inner side have a larger number of bits than in the SLC mode.

For example, the idea of the embodiment may be applied to an operation mode in which data is written into the memory cells MT corresponding to the word lines WL0, WL47, WL48, and WL95 at both ends in the Z direction in each of the stacked bodies SSTa and SSTb among the plurality of word lines WL0 to WL95 (see FIG. 14) in the SLC mode, and data is written into the memory cells MT corresponding to the word lines WL1 to WL46 and WL49 to WL94 on the inner side in the MLC mode.

Alternatively, the idea of the embodiment may be applied to an operation mode in which data is written into the memory cells MT corresponding to the word lines WL0, WL47, WL48, and WL95 at both ends in the Z direction in each of the stacked bodies SSTa and SSTb among the plurality of word lines WL0 to WL95 (see FIG. 14) in the SLC mode, and data is written into the memory cells MT corresponding to the word lines WL1 to WL46 and WL49 to WL94 on the inner side in the QLC mode.

Alternatively, the idea of the embodiment may be applied to an operation mode in which data is written into the memory cells MT corresponding to the word lines WL0, WL47, WL48, and WL95 at both ends in the Z direction in each of the stacked bodies SSTa and SSTb among the plurality of word lines WL0 to WL95 (see FIG. 14) in the SLC mode, and data is written into the memory cells MT corresponding to the word lines WL1 to WL46 and WL49 to WL94 on the inner side in the PLC mode.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor memory device comprising:
    a first stacked body in which a plurality of conductive layers are stacked with an insulating layer interposed therebetween;
    a semiconductor film extending in a stacking direction through the first stacked body to provide a channel for a plurality of memory cell transistors having gates electrically connected to the conductive layers of the first stacked body, respectively;
    an insulating film extending in the stacking direction between the plurality of conductive layers of the first stacked body and the semiconductor film; and
    a control circuit configured to control a program voltage to be applied to a conductive layer electrically connected to a memory cell transistor that is a target of a write operation, and a transfer voltage that is less than the program voltage to be applied to conductive layers electrically connected to other memory cell transistors that are not the target of the write operation, wherein
    the control circuit is configured to vary the transfer voltage to be applied depending on a number of bits that are being written in the write operation.

2. The semiconductor memory device according to claim 1, wherein the transfer voltage is controlled to be a first transfer voltage when a first number of bits is being written in the write operation and to be a second transfer voltage that is lower than the first transfer voltage when a second number of bits that is less than the first number of bits is being written in the write operation.

3. The semiconductor memory device according to claim 2, wherein the plurality of memory cell transistors are connected in series and includes a first memory cell transistor at a first end and a second memory cell transistor at a second end, and the control circuit is configured to write the second number of bits in the write operation targeting the first memory cell transistor or the second memory cell transistor and to write the first number of bits in the write operation targeting other memory cell transistors between the first memory cell transistor and the second memory cell transistor.

4. The semiconductor memory device according to claim 2, wherein the second number of bits is 1 or more.

5. The semiconductor memory device according to claim 4, wherein
    the first number of bits is 3 bits, and the second number of bits is 1 bit, and
    a difference between the second transfer voltage and the first transfer voltage is approximately 4 V.

6. The semiconductor memory device according to claim 2, wherein
    the plurality of memory cell transistors are connected in series and includes a first memory cell transistor at a first end and a second memory cell transistor at a second end, third and fourth memory cell transistors adjacent to the first and second memory cell transistors, respectively, fifth and sixth memory cell transistors adjacent to the third and fourth memory cell transistors, respectively, and a plurality of other memory cell transistors between the fifth and sixth memory cell transistors, and
    the control circuit is configured to write the second number of bits in the write operation targeting the first, second, third, fourth, fifth, and sixth memory cell transistors and to write the first number of bits in the write operation targeting the other memory cell transistors.

7. The semiconductor memory device according to claim 6, wherein the control circuit is configured to operate in a first mode or a second mode, and the first, second, third, and fourth memory cell transistors are writable only in the first mode and the fifth and sixth memory cell transistors are writable in both modes.

8. The semiconductor memory device according to claim 2, further comprising:
a second stacked body that is stacked on the first stacked body and in which a plurality of conductive layers are stacked with an insulating layer interposed therebetween, wherein
the semiconductor film extends in the stacking direction through the second stacked body to provide a channel for a plurality of memory cell transistors having gates electrically connected to the conductive layers of the second stacked body, respectively, and
the insulating film extends in the stacking direction between the plurality of conductive layers of the second stacked body and the semiconductor film.

9. The semiconductor memory device according to claim 8, wherein
the plurality of memory cell transistors having gates electrically connected to the conductive layers of the first stacked body are connected in series and includes a first memory cell transistor at a first end and a second memory cell transistor at a second end, and the plurality of memory cell transistors having gates electrically connected to the conductive layers of the second stacked body are connected in series and includes a third memory cell transistor at a first end and a fourth memory cell transistor at a second end, and
the control circuit is configured to write the second number of bits in the write operation targeting the first, second, third, or fourth memory cell transistor and to write the first number of bits in the write operation targeting other memory cell transistors between the first memory cell transistor and the second memory cell transistor and between the third memory cell transistor and the fourth memory cell transistor.

10. The semiconductor memory device according to claim 1, wherein the insulating film includes a first insulating film in contact with the semiconductor film, a charge storage film in contact with the first insulating film, and a second insulating film in contact with the charge storage film.

11. A method of performing a write operation on a semiconductor memory device comprising:
a first stacked body in which a plurality of conductive layers are stacked with an insulating layer interposed therebetween;
a semiconductor film extending in a stacking direction through the first stacked body to provide a channel for a plurality of memory cell transistors having gates electrically connected to the conductive layers of the first stacked body, respectively, the memory cell transistors including a first memory cell transistor and a second memory cell transistor; and
an insulating film extending in the stacking direction between the plurality of conductive layers of the first stacked body and the semiconductor film,
said method comprising:
determining that a first number of bits is to be written to the first memory cell transistor and a second number of bits is to be written to the second memory cell transistor;
in an operation to write a first number of bits to the first memory cell transistor, applying a program voltage to a conductive layer electrically connected to the first memory cell transistor and a first transfer voltage that is less than the program voltage to conductive layers electrically connected to the memory cell transistors other than the first memory cell transistor; and
in an operation to write a second number of bits that is less than the first number of bits, to the second memory cell transistor, applying the program voltage to a conductive layer electrically connected to the second memory cell transistor and a second transfer voltage that is less than the first transfer voltage to conductive layers electrically connected to the memory cell transistors other than the second memory cell transistor.

12. The method according to claim 11, wherein the plurality of memory cell transistors are connected in series and the first memory cell transistor is farther from either end of the plurality of memory cell transistors than the second memory cell transistor.

13. The method according to claim 12, wherein the second memory cell transistor is one of three memory cell transistors at either end of the plurality of memory cell transistors.

14. The method according to claim 11, wherein the second number of bits is 1 or more.

15. The method according to claim 14, wherein
the first number of bits is 3 bits, and the second number of bits is 1 bit, and
a difference between the second transfer voltage and the first transfer voltage is approximately 4 V.

16. The method according to claim 11, wherein the semiconductor memory device further comprises:
a second stacked body that is stacked on the first stacked body and in which a plurality of conductive layers are stacked with an insulating layer interposed therebetween, wherein
the semiconductor film extends in the stacking direction through the second stacked body to provide a channel for a plurality of memory cell transistors having gates electrically connected to the conductive layers of the second stacked body, respectively, and
the insulating film extends in the stacking direction between the plurality of conductive layers of the second stacked body and the semiconductor film.

17. The method according to claim 16, wherein
the plurality of memory cell transistors having gates electrically connected to the conductive layers of the second stacked body include a third memory cell transistor and a fourth memory cell transistor,
said method further comprising:
determining that the first number of bits is to be written to the third memory cell transistor and the second number of bits is to be written to the fourth memory cell transistor;
in an operation to write the first number of bits to the third memory cell transistor, applying the program voltage to a conductive layer electrically connected to the third memory cell transistor and the first transfer voltage to conductive layers electrically connected to other memory cell transistors in the plurality of memory cell transistors having gates electrically connected to the conductive layers of the second stacked body; and
in an operation to write the second number of bits to the fourth memory cell transistor, applying the program voltage to a conductive layer electrically connected to the fourth memory cell transistor and the second transfer voltage to conductive layers electrically connected to other memory cell transistors in the plurality of memory cell transistors having gates electrically connected to the conductive layers of the second stacked body.

18. The method according to claim 17, wherein said determining is performed based on a position of the memory cell transistor to be written in the plurality of memory cell transistors in which the memory cell transistor is serially connected to other memory cell transistors.

19. The method according to claim 18, wherein the third memory cell transistor is farther from either end of the plurality of memory cell transistors in which the third memory cell transistor is serially connected than the fourth memory cell transistor.

20. The method according to claim 11, wherein the insulating film includes a first insulating film in contact with the semiconductor film, a charge storage film in contact with the first insulating film, and a second insulating film in contact with the charge storage film.

* * * * *